(12) United States Patent
Ren et al.

(10) Patent No.: US 12,411,327 B2
(45) Date of Patent: Sep. 9, 2025

(54) PERFORMING STRUCTURED ILLUMINATION MICROSCOPY ON A PATTERNED SUBSTRATE

(71) Applicant: Illumina, Inc., San Diego, CA (US)

(72) Inventors: Hongji Ren, San Diego, CA (US); John Moon, Rancho Santa Fe, CA (US)

(73) Assignee: Illumina, Inc., San Diego, CA (US)

( * ) Notice: Subject to any disclaimer, the term of this patent is extended or adjusted under 35 U.S.C. 154(b) by 728 days.

(21) Appl. No.: 17/654,941

(22) Filed: Mar. 15, 2022

(65) Prior Publication Data

US 2022/0299744 A1      Sep. 22, 2022

Related U.S. Application Data

(60) Provisional application No. 63/200,639, filed on Mar. 19, 2021.

(51) Int. Cl.
*G02B 21/00*   (2006.01)
*G02B 21/06*   (2006.01)

(52) U.S. Cl.
CPC ..... *G02B 21/0076* (2013.01); *G02B 21/0032* (2013.01); *G02B 21/06* (2013.01)

(58) Field of Classification Search
CPC ............... G02B 21/0004; G02B 21/00; G02B 21/0008; G02B 21/06; G02B 21/0032; G02B 21/0076
See application file for complete search history.

(56) References Cited

U.S. PATENT DOCUMENTS

| | | |
|---|---|---|
| 9,182,219 B1 | 11/2015 | Manassen et al. |
| 10,831,012 B2 | 11/2020 | Carney et al. |
| 10,901,202 B2 | 1/2021 | Hong et al. |
| 10,976,532 B2 | 4/2021 | Park |
| 2010/0284015 A1 | 11/2010 | Sewell |
| 2012/0257197 A1 | 10/2012 | Feldkhun et al. |
| 2013/0314717 A1 | 11/2013 | Yi et al. |
| 2013/0335819 A1 | 12/2013 | Cooper |
| 2016/0048969 A1 | 2/2016 | Zhao et al. |

(Continued)

FOREIGN PATENT DOCUMENTS

| | | |
|---|---|---|
| TW | 200935191 A | 8/2009 |
| TW | 201606262 A | 2/2016 |
| WO | 2017213464 A1 | 12/2017 |

OTHER PUBLICATIONS

International Search Report and Written Opinion for PCT Application No. PCT/US2022/071164, mailed on Jun. 27, 2022, 11 pages.

(Continued)

*Primary Examiner* — Ricky L Mack
*Assistant Examiner* — Journey F Sumlar
(74) *Attorney, Agent, or Firm* — Illumina, Inc.

(57) ABSTRACT

A structured illumination microscopy (SIM) system comprises: a light source; a light-structuring component to provide light from the light source with a SIM pattern for performing illuminations of a sample at a substrate having a substrate pattern, wherein a pitch of the SIM pattern is based on a characteristic of the substrate pattern; and an image sensor to detect emissions that the sample generates in response to the illuminations.

30 Claims, 10 Drawing Sheets

(56) References Cited

U.S. PATENT DOCUMENTS

| | | |
|---|---|---|
| 2019/0212266 A1* | 7/2019 | Baker ................ G01N 21/6454 |
| 2019/0226992 A1* | 7/2019 | Guo ................... G01N 21/6458 |
| 2020/0004004 A1 | 1/2020 | Carney et al. |
| 2020/0088992 A1 | 3/2020 | Hong et al. |
| 2020/0103639 A1 | 4/2020 | Skinner et al. |
| 2020/0192071 A1 | 6/2020 | Newman et al. |
| 2020/0218050 A1 | 7/2020 | Newman et al. |
| 2020/0218052 A1 | 7/2020 | Hong |
| 2020/0242735 A1* | 7/2020 | Dai ...................... G02B 21/367 |

OTHER PUBLICATIONS

Office Action for Taiwanese Patent Application No. 111109407, mailed on Sep. 30, 2022, 22 pages.

\* cited by examiner

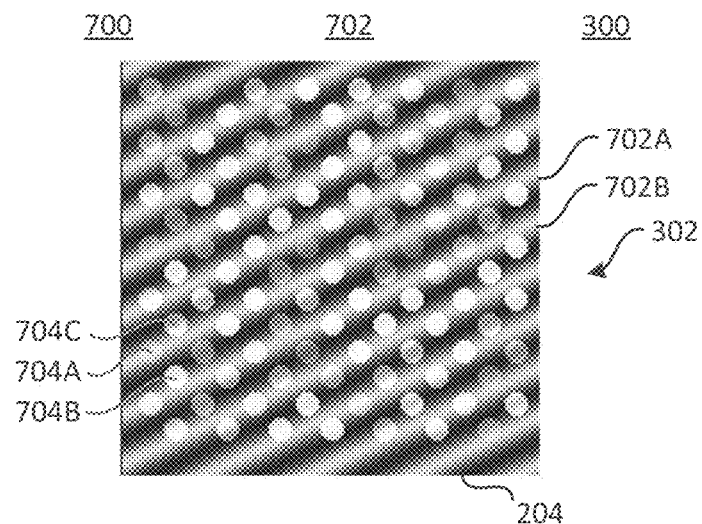
FIG. 7
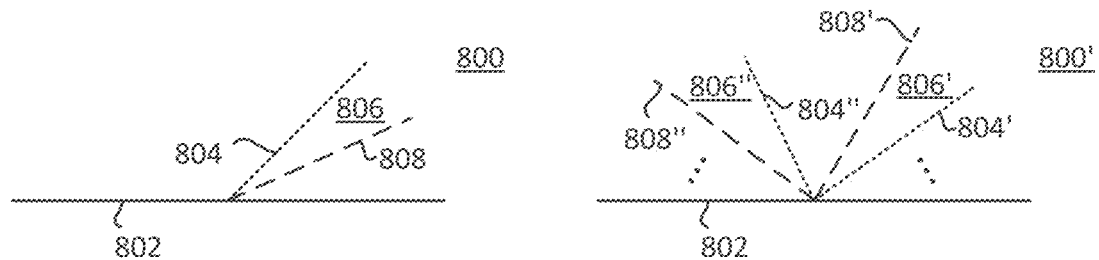
FIG. 8A
FIG. 8B
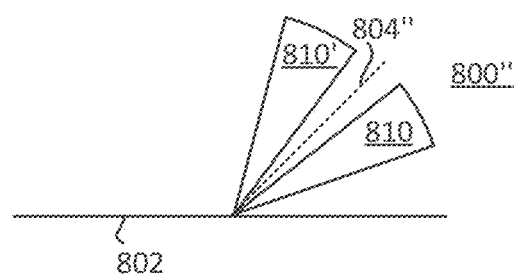
FIG. 8C

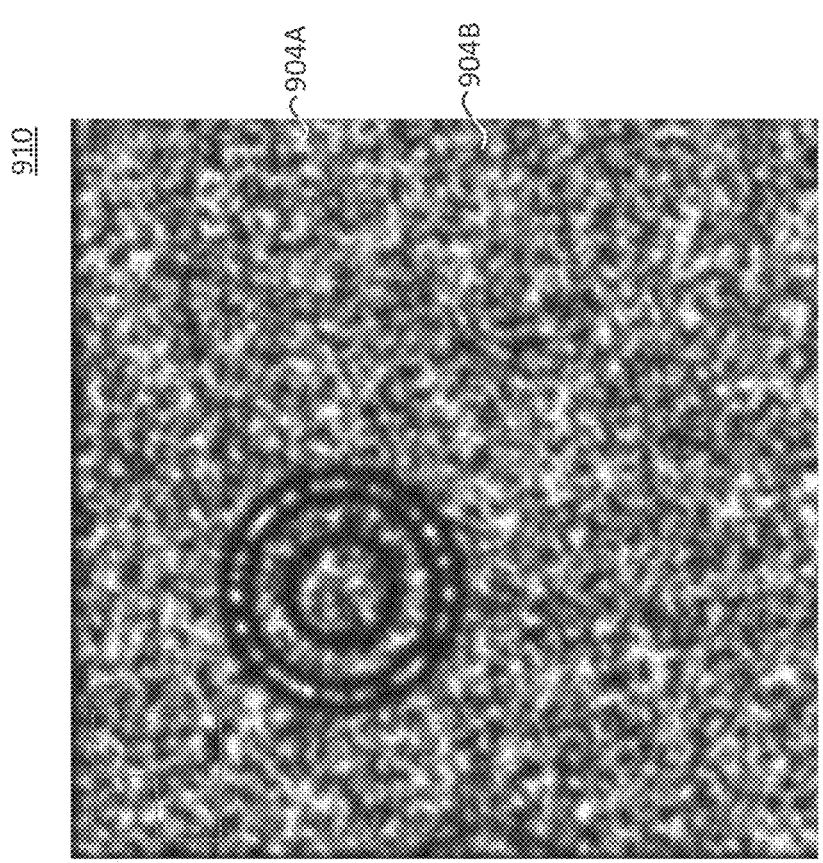
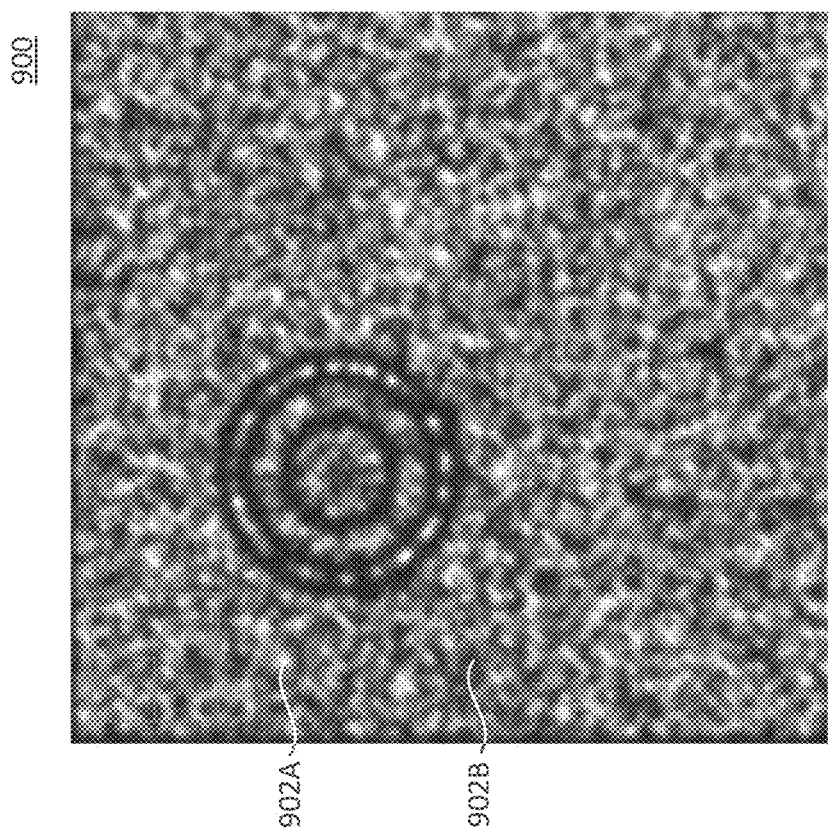
FIG. 9A
FIG. 9B

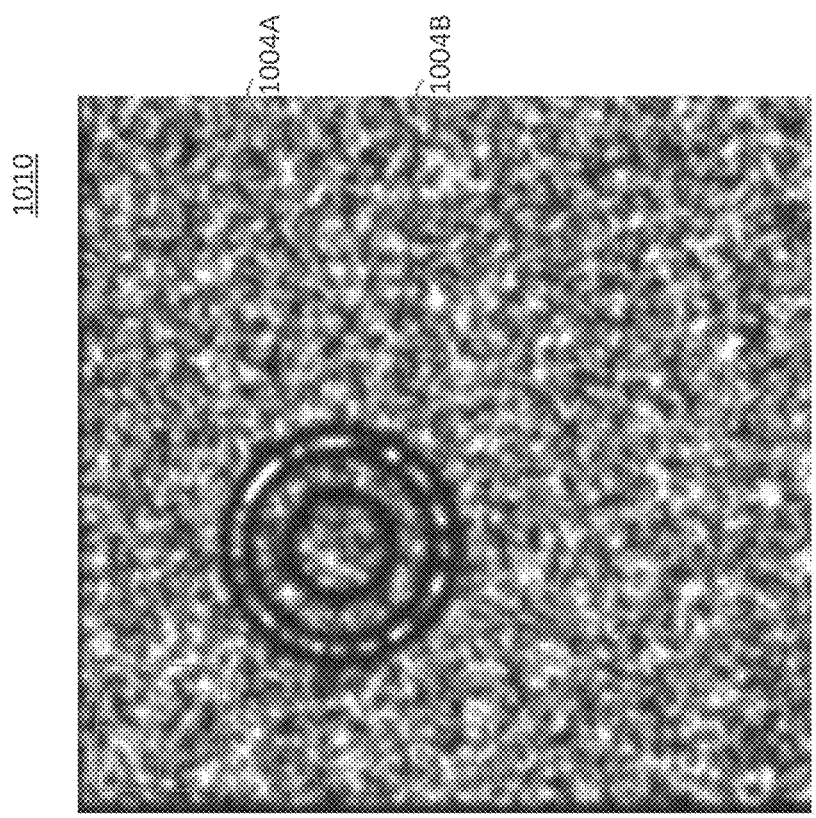
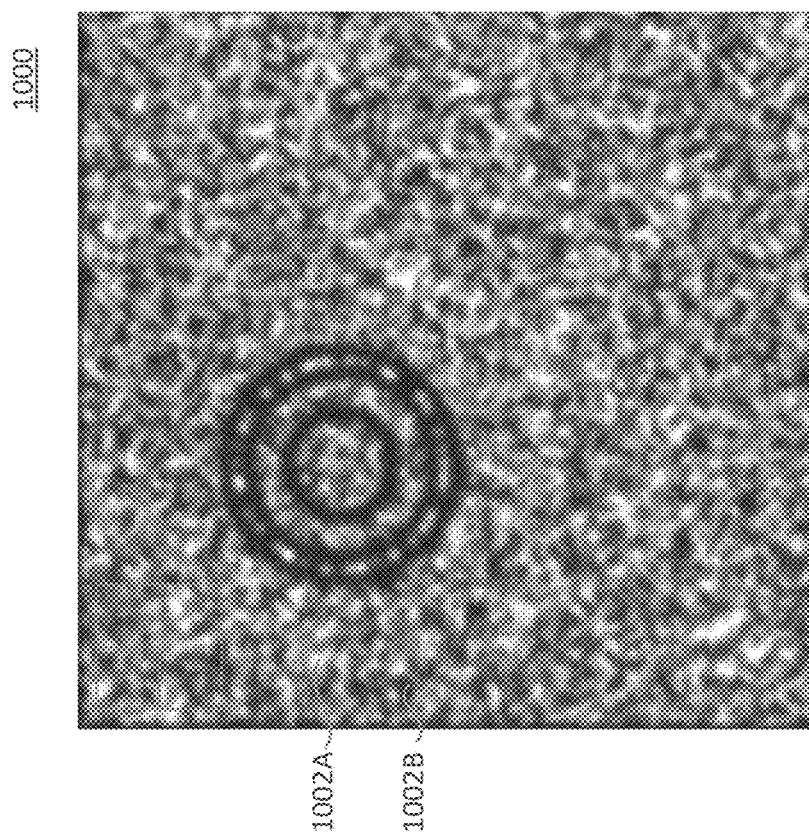
FIG. 10A
FIG. 10B

PERFORMING STRUCTURED ILLUMINATION MICROSCOPY ON A PATTERNED SUBSTRATE

CROSS-REFERENCE TO RELATED APPLICATION

This application claims priority to U.S. Provisional Application 63/200,639, filed Mar. 19, 2021, and entitled "PERFORMING STRUCTURED ILLUMINATION MICROSCOPY ON A PATTERNED SUBSTRATE," the contents of which are incorporated herein by reference.

BACKGROUND

Structured illumination microscopy (SIM) has been used to increase the resolution of images obtained from a sample. SIM utilizes several images of a sample with differing fringe patterns so that different locations on the sample are exposed to a range of illumination intensities. In some instances, the procedure can be repeated by rotating the pattern orientation about the optical axis at separate angles. The captured images may be assembled into a single image having an extended spatial frequency bandwidth, which may be retransformed into real space to generate an image having a higher resolution than one captured by a conventional microscope. Existing approaches to SIM may have one or more characteristics that increase the complexity, size, manufacturing cost, and/or the cost of operation of the system.

SUMMARY

In a first aspect, a structured illumination microscopy (SIM) system comprises: a light source; a light-structuring component to provide light from the light source with a SIM pattern for performing illuminations of a sample at a substrate having a substrate pattern, wherein a pitch of the SIM pattern is based on a characteristic of the substrate pattern; and an image sensor to detect emissions that the sample generates in response to the illuminations.

Implementations can include any or all of the following features. The substrate pattern includes a periodic pattern, and the pitch of the SIM pattern is based on a pitch of the periodic pattern. The pitch of the SIM pattern is greater than the pitch of the periodic pattern. The pitch of the SIM pattern is between about 1.5 and about 2 times the pitch of the periodic pattern. The light-structuring component includes a grating for generating the SIM pattern, the grating corresponding to the pitch of the periodic pattern. The substrate pattern comprises nanowells formed at the substrate. The substrate pattern comprises that the nanowells are arranged in a square array. The square array has the nanowells arranged in linear rows and linear columns, wherein the linear rows are substantially perpendicular to the linear columns. A first linear row or linear column is illuminated by the SIM pattern, wherein a second linear row or linear column is parallel to and adjacent the first linear row or linear column, and wherein the second linear row or linear column is not illuminated by the SIM pattern when the first linear row or linear column is illuminated by the SIM pattern. The light source includes at least one of a laser or a light-emitting diode. The sample comprises a biological material, and wherein the image sensor is to sense fluorescence emitted by the sample in response to the illuminations. The SIM system is configured to rotate the SIM pattern about an optical axis into modulation angles, wherein at least one of the illuminations is performed at each of the modulation angles of the SIM pattern. The substrate pattern is a periodic pattern, and wherein the SIM system is configured to provide an offset to each of the modulation angles of the SIM pattern to form offset modulation angles, none of the offset modulation angles corresponding to an angle of a symmetry axis of the periodic pattern, wherein at least one of the illuminations is performed at each of the offset modulation angles of the SIM pattern. The substrate pattern includes a random pattern, and wherein the pitch of the SIM pattern is based on a resolution relating to the random pattern. The pitch of the SIM pattern is about a same order of magnitude as the resolution relating to the random pattern.

In a second aspect, a method comprises: configuring a structured illumination microscopy (SIM) system for performing illuminations of a sample at a substrate having a substrate pattern; selecting a pitch of a SIM pattern of the SIM system based on a characteristic of the substrate pattern; performing the illuminations of the sample at the substrate with the SIM pattern; and detecting emissions that the sample generates in response to the illuminations.

Implementations can include any or all of the following features. The substrate pattern includes a periodic pattern. The pitch of the SIM pattern is selected based on a pitch of the periodic pattern. Selecting the pitch of the SIM pattern comprises configuring the SIM system with a grating for generating the SIM pattern, the grating corresponding to the pitch of the periodic pattern. The grating has a pitch that is between about 1.5 and about 2 times the pitch of the periodic pattern. The sample comprises a biological material, and wherein detecting the emissions comprises detecting fluorescence emitted by the sample in response to the illuminations.

In a third aspect, a structured illumination microscopy (SIM) system comprises: a light source; a light-structuring component to provide light from the light source with a SIM pattern for performing illuminations of a sample at a substrate having a periodic pattern, the light-structuring component configured for rotation of the SIM pattern about an optical axis into modulation angles, and for providing an offset to each of the modulation angles of the SIM system to form offset modulation angles, none of the offset modulation angles corresponding to an angle of a symmetry axis of the periodic pattern; and an image sensor to detect emissions that the sample generates in response to the illuminations.

Implementations can include any or all of the following features. The offset is provided such that each of the offset modulation angles is smaller than the corresponding modulation angle. The offset is provided such that each of the offset modulation angles is greater than the corresponding modulation angle. The offset is about 10-30 degrees. The offset is about 20 degrees. One of the modulation angles is about 45 degrees, and wherein the offset modulation angle corresponding to the one of the modulation angles is about 25 degrees. The periodic pattern comprises nanowells formed at the substrate. The periodic pattern comprises that the nanowells are arranged in a square array. The square array has the nanowells arranged in linear rows and linear columns, wherein the linear rows are substantially perpendicular to the linear columns. A first nanowell is illuminated by the SIM pattern, wherein a second nanowell is adjacent the first nanowell, and wherein the second nanowell is not illuminated by the SIM pattern when the first nanowell is illuminated by the SIM pattern. The light source includes at least one of a laser or a light-emitting diode. A pitch of the SIM pattern is based on a pitch of the periodic pattern. The pitch of the SIM pattern is between about 1.5 and about 2 times the pitch of the periodic pattern.

In a fourth aspect, a method comprises: configuring a structured illumination microscopy (SIM) system for rotation of a SIM pattern about an optical axis into modulation angles, the SIM system configured for performing illuminations of a sample at a substrate having a periodic pattern; providing an offset to each of the modulation angles of the SIM system to form offset modulation angles, none of the offset modulation angles corresponding to an angle of a symmetry axis of the periodic pattern; performing the illuminations of the sample at the substrate with the SIM pattern at the offset modulation angles; and detecting emissions that the sample generates in response to the illuminations.

BRIEF DESCRIPTION OF DRAWINGS

FIG. 7 shows an example of projection of excitation illumination light of SIM fringes using a SIM pattern onto the substrate of FIG. 3 where a modulation angle of the SIM pattern has been offset relative to the angle of the periodic pattern of the substrate.

FIGS. 8A-8C show examples of providing an offset to a modulation angle of a SIM pattern to form an offset modulation angle.

FIGS. 9A-9B show examples of images captured without (FIG. 9A) and with (FIG. 9B) an offset on a modulation angle.

FIGS. 10A-10B show other examples of images captured without (FIG. 10A) and with (FIG. 10B) an offset on a modulation angle.

DETAILED DESCRIPTION

Figure 1:
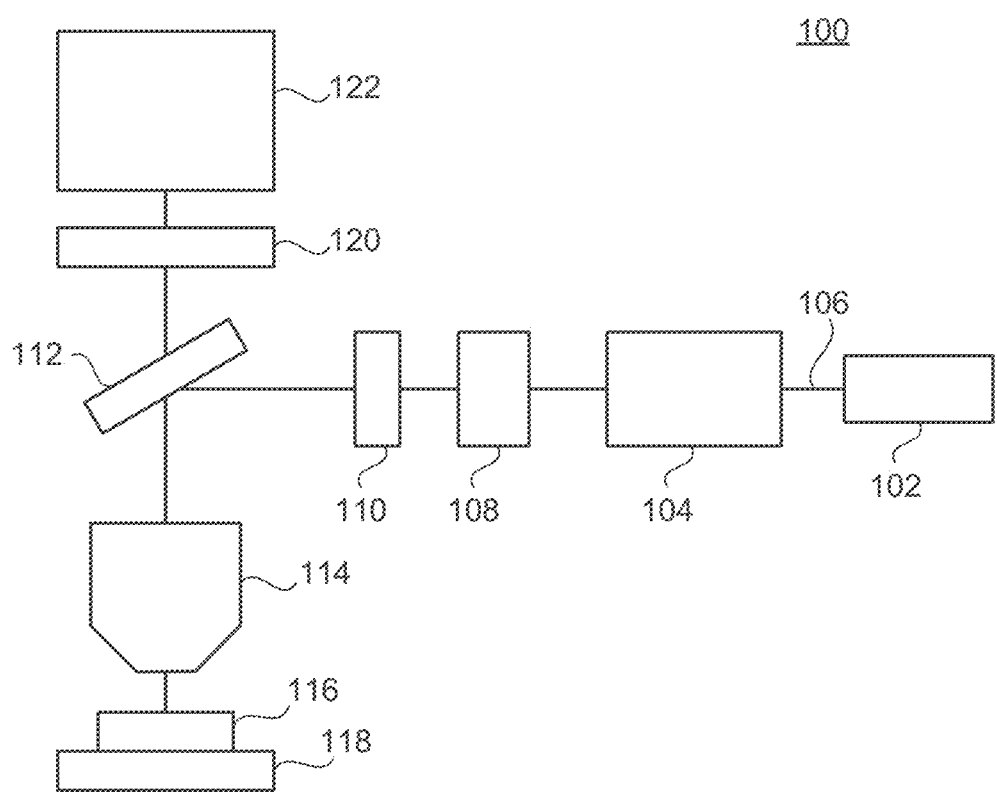
FIG. 1 is a schematic view of an example system that can facilitate structured illumination microscopy (SIM) and in which a phase selector is placed after a reflective component.

This document describes examples of systems and techniques that can improve structured illumination, including, but not limited to, by providing structured illumination microscopy (SIM) with increased resolution and/or increased reliability. Such systems/techniques can provide one or more advantages over existing approaches, for example as will be described below. The examples described herein are based on simulations unless otherwise noted.

SIM can be performed to achieve increased resolution (sometimes referred to as "super-resolution") of substrates. One or more of a number of different types of samples can be analyzed. For other types of analysis, whether biological or non-biological, the substrate may be periodically patterned. However, optical aspects such as the pitch of the SIM pattern and the angle thereof have generally been chosen considering the optical system (e.g., the numerical aperture, pixel size, etc.) and not whether the substrate had a periodic pattern, and in particular, any characteristics of such periodic pattern.

As disclosed herein, if the substrate has a periodic pattern, one or more characteristics of the SIM pattern can be chosen so as to create advantageous net combination effects. For example, a certain instance or range of the pitch of the SIM pattern and/or the angle of the SIM pattern can significantly enhance the achieved resolution. As such, the problem of inefficient SIM resolution enhancement of periodically patterned substrates (e.g., patterned flow cells) can be solved by a choice of the pitch and/or angle of the SIM pattern that is used for illuminating the sample. In some implementations, the SIM pattern can be selected to be different from (e.g., have at least one characteristic not identical with) the periodic pattern of the substrate. For example, the modulation angle of the SIM pattern can be selected to be different from (e.g., to not coincide with) a symmetry axis of the periodic pattern, and/or a pitch of the SIM pattern can be selected to be different from (e.g., larger than) the pitch of the periodic pattern of the substrate. When the substrate has a random pattern, the pitch of the SIM pattern can be selected to be of about the same order of magnitude as a fine structure resolution of the substrate pattern.

Imaging (e.g., using SIM) can be performed to analyze a sample of any of multiple materials. In some implementations, SIM imaging or another type of imaging can be performed as part of biological analysis of a biological material, or chemical analysis of any material. For example, a process of sequencing genetic material can be performed. In one example, the process can be a DNA sequencing process, e.g., sequencing-by-synthesis or next-generation sequencing (also known as high-throughput sequencing). In another example, the process may be used to enable genotyping. Genotyping involves determining differences in the genetic make-up (genotype) of an individual by examining the individual's DNA sequence using biological assays and comparing it to another individual's sequence or a reference sequence. Such processes can involve fluorescent imaging, where a sample of genetic material is subjected to excitation light (e.g., a laser beam) to trigger a fluorescent emission response by one or more markers associated with the genetic material. Some nucleotides can have fluorescent tags associated with the nucleotide to fluoresce responsive to exposure to an excitation energy source. A wavelength spectra of the fluorescent emission response can be used to determine the presence of a corresponding nucleotide. Fluorescent emission responses can be detected over the course of the sequencing process and used to build a record of nucleotides in the sample.

SIM imaging is based on spatially structured light. For example, the structure can consist of or include a pattern in the illuminating light that helps increase the resolution of the obtained image(s). In some implementations, the structure can include patterns of fringes. Fringes of light can be generated by impinging a light beam on a diffraction grating (referred to as a grating for simplicity) such that reflective or transmissive diffraction occurs. The structured light can be impinged on the fluorescent tags associated with the sample, illuminating the fluorescent tags associated with the sample according to the respective fringes which may occur according to some periodicity. For example, images of the fluorescent emissions from the fluorescent tags associated with the sample can be acquired at different phases of the fringes in the structured light, sometimes referred to as the respective pattern phases of the images. This can allow various locations of the fluorescent tags associated with the sample to be exposed to a multitude of illumination intensities. The pattern of the structured light can be rotated relative to the sample, and the images just mentioned can be captured for each of the rotation angles. The SIM system can provide light with one or more SIM patterns for impinging on the fluorescent tags associated with a sample or substrate. The SIM patterns can differ from each other in terms of a pitch, meaning a distance between adjacent fringes of the SIM pattern. SIM systems can be used with one or more excitation light sources. A single-mode laser, a light-emitting diode (LED), or a multimode laser can be used, to name just some examples.

Imaging can be performed as part of the process of analyzing sample material. This can involve fluorescent imaging, such as when a sample of genetic material is subjected to light (e.g., a laser beam) to trigger a fluorescent response by one or more markers associated with the genetic material. Some nucleotides can have fluorescent tags applied to them and which pair with a complementary nucleotide of the sample genetic material, which allows for determination of the presence of the nucleotide of the sample genetic material by shining excitation light onto, and looking for a fluorescent response from, the sample. Fluorescent responses can be detected over the course of the analysis process by detecting wavelength emissions spectra and used to build a record of nucleotides in the sample.

Examples herein refer to substrates. A substrate may refer to any material that provides a substantially rigid structure, or to a structure that retains its shape rather than taking on the shape of a vessel to which it is placed in contact. The material can have a surface to which another material can be attached including, for example, smooth supports (e.g., metal, glass, plastic, silicon, and ceramic surfaces), as well as textured and/or porous materials. Possible substrates include, but are not limited to, glass and modified or functionalized glass, plastics (including acrylics, polystyrene and copolymers of styrene and other materials, polypropylene, polyethylene, polybutylene, polyurethanes, Teflon™, etc.), polysaccharides, nylon or nitrocellulose, resins, silica or silica-based materials including silicon and modified silicon, carbon, metals, inorganic glasses, plastics, optical fiber bundles, and a variety of other polymers. In general, the substrates allow optical detection and do not themselves appreciably fluoresce.

Examples herein refer to a substrate having a periodic pattern. A periodic pattern includes one or more types of structure that is repeated at least once. A distance between the repeated structures can be referred to as a pitch of the periodic pattern. In some implementations, a periodic pattern comprises nanowells formed in the substrate. Nanowells can be arranged periodically in rows and/or columns. The periodic pattern can form one or more arrays. An array can include a hexagonal array, a square array, or another array according to a Cartesian system that involves periodicity.

Examples herein refer to a substrate having a random pattern. In a random pattern, the relative locations of a subset of wells (or other structures) in one region of the substrate surface is not known or predictable from the locations of a subset of wells (or other structures) in another region of the substrate surface. A random pattern generally does not include multiple repetitions of any sub-patterns.

Examples described herein refer to flow cells. A flow cell is a substrate that can be used in preparing and accommodating or carrying one or more samples in at least one stage of an analysis process. The flow cell is made of a material that can be usable with both the sample genetic material and the illumination and chemical reactions to which it will be exposed. The substrate can have one or more channels in which sample genetic material can be deposited. A substance (e.g., a liquid) can be flowed through the channel where the sample genetic material is present to trigger one or more chemical reactions and/or to remove unwanted material. The flow cell may enable the imaging by facilitating that the sample in the flow cell channel can be subjected to illuminating excitation light and that any fluorescent emission responses from the sample can be detected. Some implementations of the system may be designed to be used with at least one flow cell, but may not include the flow cell(s) during one or more stages, such as during shipping or when delivered to a customer. For example, the flow cell(s) can be installed into an implementation at the customer's premises in order to perform analysis.

Different types of gratings can be used to provide the SIM pattern(s) in some implementations. The grating(s) can include one or more forms of periodic structure. In some implementations, the gratings can be formed by removing or omitting physical material from a substrate. In other implementations, optical filters or other non-physical materials may be implemented to form the gratings. For example, the substrate can be provided with a set of slits and/or grooves therein to form the grating. In some implementations, the grating can be formed by adding material to the substrate. For example, periodically spaced structures can be formed on the substrate by the same or a different material.

The examples described herein can provide advantages compared to previous approaches. In some implementations, image quality of a SIM system can be improved. In some implementations, sample analysis by SIM can be improved. In some implementations, a resolution of a SIM system can be improved. In some implementations, throughput of a SIM system for sample analysis can be increased. In some implementations, crosstalk between adjacent nanowells, or between adjacent rows or columns of nanowells, can be reduced or eliminated. In some implementations, a substrate for holding samples in SIM analysis can be provided with a spatially more dense pattern. In some implementations, aliasing in a SIM system can be reduced or eliminated.

FIG. 1 schematically shows an example of a system 100 that can facilitate SIM imaging. The system 100 can be used in combination with one or more other examples described herein. Some components in this and other examples are shown conceptually as a block or other generic component; such component(s) can be implemented in form of one or more separate or integrated components so as to perform the indicated function(s).

The system 100 includes a light source 102. The light source 102 can be selected based on the type(s) of sample, coherence, and/or power output for which the system 100 is to be implemented. For example, a multimode laser can be used as the light source 102. As another example, a single-mode laser can be used as the light source 102. As another example, an LED or several LEDs can be used as the light source 102.

The system 100 includes a light-structuring component 104 that receives light from the light source 102. In some implementations, the light-structuring component 104 facilitates that the received light impinges on one or more gratings so as to generate a pattern of light fringes. The light-structuring component 104 can include a grating. One or more reflective components can be used for directing the light onto the proper grating. In some implementations, the light-structuring component 104 can select, or can be used for selecting, a pitch for a SIM pattern that the system 100 should apply to a sample. In some implementations, the light-structuring component 104 can provide, or can be used for providing, an offset to a modulation angle, thereby affecting a rotation of the SIM pattern about an optical axis of the system 100. A beam 106 extending between the light source 102 and the light-structuring component 104 schematically illustrates the propagation of light. The light-structuring component 104 can generate structured light and provide the structured light to a subsequent component in the system 100. Light-structuring component 104 can include a structure, such as a grating, to implement any of the SIM patterns 200, 502, 702 described herein.

In some implementations, the subsequent component is a phase selector 108 in the system 100. The phase selector 108 can receive light from the light-structuring component 104. The phase selector 108 is used for selecting the pattern phase at which an image will be captured. In some implementations, the phase selector 108 can facilitate selecting among multiple candidate pattern phases according to a desired illumination of the sample or to a required degree of resolution. In some implementations, the pattern phase can correspond to a relative position between a SIM pattern and a sample. For example, the phase selector 108 can translate a grating into positions that correspond to respective pattern phases, with illumination of the sample at each pattern phase.

The system 100 includes a projection lens 110 that can receive light from the phase selector 108. Such light can be referred to as phase-selected light to indicate that the light corresponds to a selection of the particular pattern phase(s) having been done, such as by way of the phase selector 108. The projection lens 110 can include one or more optical elements such as lenses that condition the phase-selected light before it impinges on a next stage in the system 100.

The system 100 includes a mirror 112 that at least partially reflects light from the projection lens 110 toward an objective lens 114. In some implementations, the mirror 112 provides selective transmission, such as to reflect some part(s) of illuminating light arriving from the projection lens 110 and to transmit at least some part of imaging light arriving at the mirror 112 from the objective lens 114. For example, the mirror 112 can be a dichroic mirror.

The objective lens 114 receives illumination light from the mirror 112. The objective lens 114 can include one or more optical elements such as lenses that condition light from the projection lens 110 (as reflected by the mirror 112) before light impinges on a next stage in the system 100.

The objective lens 114 directs light onto a sample 116. In some implementations, the sample 116 includes one or more materials to be analyzed. For example, the sample 116 can include biological material (e.g., genetic material) to be illuminated for detection of fluorescent responses of fluorescent tags associated with the sample 116. The sample 116 can be held on a suitable substrate, including, but not limited to, a flow cell that allows liquids or other fluids to selectively be flowed relative to the sample. For example, the sample 116 can be subjected to one or more reagents containing one or more nucleotides having an associated fluorescent tag prior to illumination and thereafter image capturing and analysis. The substrate can have a periodic pattern. For example, one or more arrays of nanowells can be formed on the substrate.

The sample 116 can be held by a stage 118 in the system 100. The stage 118 can provide one or more types of manipulation relative to the sample 116. In some implementations, physical movement of the sample 116 can be provided. For example, the stage 118 can translationally and/or rotationally reposition the sample 116 relative to at least one other component of the system 100. In some implementations, thermal treatment of the sample 116 can be provided. For example, the stage 118 can heat and/or cool the sample 116.

Phase selection can be facilitated by the stage 118. In some implementations, the stage 118 can translate the sample 116 a distance relative to stationary light fringes to accomplish phase selection (e.g., using a piezo actuator in the stage 118). For example, the phase selector 108 can then be bypassed in, or eliminated from, the system 100.

Light originating in the light source 102, conditioned in the described components, can be directed at the fluorescent tags associated with the sample 116 for illumination after propagating through the objective lens 114. Any light emitted by the fluorescent tags associated with the sample 116 can traverse the objective lens 114 in an opposite direction and partially or entirely be transmitted through the mirror 112. The system 100 can include a filter component 120 receiving light from the objective lens 114 through the mirror 112. The filter component 120 can filter such light in one or more ways. For example, the filter component 120 can pass through some particular wavelength spectra above or below a predetermined level and/or block (or reflect) some other particular wavelength spectra above or below a predetermined level. In some implementations, the mirror 112 can incorporate the filter component 120 as part of the mirror, such as by positioning the filter component 120 on a rear surface of the mirror 112.

Light traversing the filter component 120 can enter a camera system 122 in the system 100. The camera system 122 can include one or more image sensors capable of detecting electromagnetic radiation of the kind(s) relevant to the analysis to be performed. The camera system 122 and/or another image sensor can detect emissions that the fluorescent tags associated with the sample 116 generate in response to illumination. In some implementations, the camera system 122 is configured for capturing images of fluorescent light emissions emitted by the fluorescent tags responsive to excitation light. For example, the camera system 122 can include a charge-coupled device, a complementary metal-oxide semiconductor device, or other image capture device. In some implementations, the camera system 122 can sense fluorescence emitted by the fluorescent tags associated with the sample 116 in response to one or more excitation illuminations. The camera system 122 can generate output in digital and/or analog form. For example, data corresponding to an image captured by the camera system 122 can be stored by the camera system 122 or can be sent to a separate component (e.g., a computer system or other device) for storage and/or analysis. In some implementations, the camera system 122 can be complemented by, or replaced with, a detector within or at the substrate where the sample 116 is positioned. For example, on-chip microscopy can be performed using sensor pixels at the substrate to detect emissions from the fluorescent tags associated with the sample 116.

As an example, use of the system 100 can involve performing a method that includes: configuring a SIM system (e.g., the system 100) for performing illuminations of a sample (e.g., the sample 116) at a substrate having a periodic pattern; selecting a pitch (e.g., at the light-structuring component 104) for a SIM pattern of the SIM system based on a pitch of the periodic pattern of the substrate on which the sample is positioned; performing the illuminations of the fluorescent tags associated with the sample at the substrate with the SIM pattern (e.g., by way of the objective lens 114); and detecting emissions (e.g., using the camera system 122) that the fluorescent tags associated with the sample generate in response to the illuminations.

As another example, use of the system 100 can involve performing a method that includes: configuring a SIM system (e.g., the system 100) for rotation of a SIM pattern (e.g., at the light-structuring component 104) about an optical axis into modulation angles, the SIM system configured for performing illuminations of a sample (e.g., the sample 116) at a substrate having a periodic pattern; providing an offset (e.g., at the light-structuring component 104) to each of the modulation angles of the SIM system to form offset modulation angles such that none of the offset modulation angles corresponding to an angle of a symmetry axis of the periodic pattern of the substrate on which the sample is positioned; performing the illuminations of the fluorescent tags associated with the sample at the substrate (e.g., by way of the objective lens 114) with the SIM pattern at the offset modulation angles; and detecting emissions (e.g., using the camera system 122) that the fluorescent tags associated with the sample generate in response to the illuminations.

Figure 2:
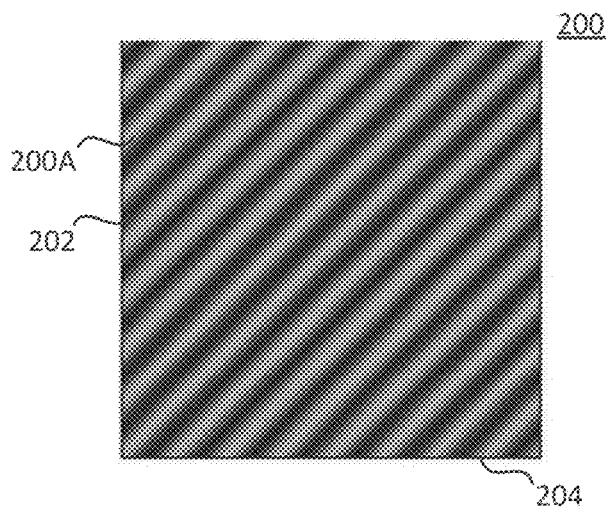
FIG. 2 shows an example of a SIM pattern.

FIG. 2 shows an example of a SIM pattern 200. The SIM pattern 200 can be used with one or more other examples described elsewhere herein. The SIM pattern 200 is here shown as relatively lighter areas visible against an arbitrary background of relatively darker areas. The SIM pattern 200 can be generated by directing light at one or more gratings. The SIM pattern 200 includes SIM fringes 200A that are here parallel to each other and separated by bands 202 where excitation illumination light is blocked from illuminating the background. The bands 202 and SIM fringes 200A can be formed where a physical grating blocks excitation illumination light to form bands 202 and permit illumination to pass through to form SIM fringes 200A. The SIM pattern 200 can form a periodic pattern having a particular pitch defined based on a distance between adjacent SIM fringes 200A or bands 202. In some implementations, the SIM pattern 200 can have the SIM fringes 200A distributed so as to form a sinusoidal distribution of light. For example, the pitch of the SIM pattern 200, the distance from one of the SIM fringes 200A to the adjacent one, can be about 400 nanometers (nm). In some implementations, the pitch of the SIM pattern 200 can be between about 200 nanometers, inclusive, and 1600 nanometers, inclusive. Greater or smaller values of the pitch can be used.

One or more directions can be used as a reference for describing an orientation of the SIM pattern 200. In some implementations, the orientation of the SIM pattern 200 can be defined relative to a reference axis 204, which here extends horizontally in the plane of the illustration. For example, the reference axis 204 can correspond to a camera pixel direction (e.g., vertical or horizontal). SIM pattern 200 here forms an angle with regard to the reference axis 204 that is about 45 degrees. In some implementations, the angle of the SIM pattern 200 can be between about 0 degrees, inclusive, and 90 degrees, inclusive. Greater or smaller values of the angle can be used.

Figure 3:
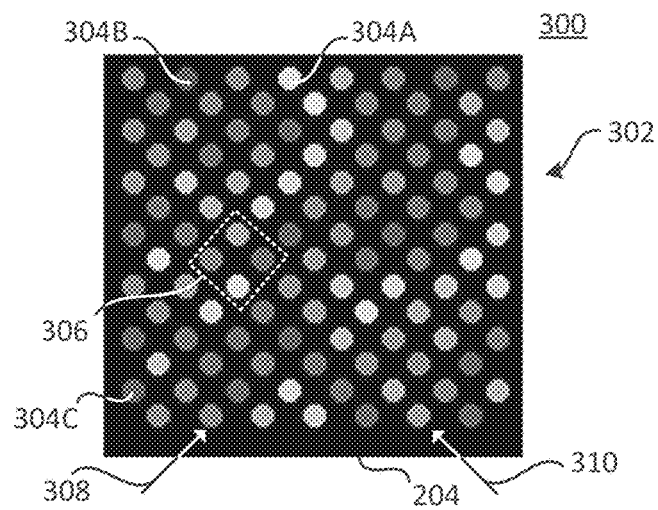
FIG. 3 shows an example of a substrate having a periodic pattern.

FIG. 3 shows an example of a substrate 300 having a periodic pattern 302. The substrate 300 and/or the periodic pattern 302 can be the structure on which the sample 116 of FIG. 1 is positioned and/or used with one or more other examples described elsewhere herein. The substrate 300 can include one or more materials suitable for holding or otherwise accommodating the at least one sample to be analyzed. The sample can be distributed over some or all of the substrate 300. Here, a sample 304A is shown using a first shade, a sample 304B is shown using a second shade, and a sample 304C is shown using a third shade. For example, the different shades of the samples 304A-304C can represent the fact that the samples 304A-304C can be determined as a certain nucleotide based on fluorescent emissions from fluorescent tags associated with the sample in response to excitation illumination. The samples of the substrate 300 (including the samples 304A-304C) may be positioned in discrete locations due to the presence of the periodic pattern 302 at the substrate 300. In some implementations, the samples 304A-304C can be polyclonal (e.g., having more than one sequence of genetic material). In some implementations, the periodic pattern 302 can include wells (e.g., nanowells) formed at the substrate 300, in which wells/nanowells biologic material can be held. For example, genetic material can be deposited and/or amplified in each of multiple nanowells of the substrate 300. The purpose of the analysis can be to detect the fluorescence emitted by the fluorescent tags associated with respective samples 304A-304C and thereby determine the identity of at least one nucleotide that is part of the corresponding sample 304A-304C.

The nanowells can be arranged in one or more arrays in the periodic pattern 302. Here, the nanowells containing samples of the substrate 300 (including the samples 304A-304C) are arranged in a square array. For example, a box 306 here surrounds four of the samples to illustrate the spatial arrangement. The periodic pattern can comprise linear rows and/or linear columns. Here, a linear row can be defined as a series of samples positioned along a direction indicated by an arrow 308. Here, a linear column can be defined as a series of samples positioned along a direction indicated by an arrow 310. The linear rows are here substantially perpendicular to the linear columns. Other directions of linear rows and/or linear columns can be used. The linear rows and the linear columns of the periodic pattern 302 here both form an angle with regard to the reference axis 204 that is about 45 degrees. In some implementations, the angle of the periodic pattern 302 can be between about 0 degrees, inclusive, and 90 degrees, inclusive. Greater or smaller values of the angle can be used. Also, the pitch of the periodic pattern 302 can be defined as the distance from one of the linear rows to the adjacent one, or as the distance from one of the linear columns to the adjacent one. For example, the pitch can be about 400 nm. In some implementations, the pitch of the periodic pattern 302 can be between about 200 nanometers, inclusive, and 1600 nanometers, inclusive. Greater or smaller values of the pitch can be used.

In this example, the substrate pattern (e.g., the periodic pattern 302) forms about a 45-degree angle to the camera. Other orientations having greater or smaller angles relative to the camera can be used. For example, the substrate pattern (e.g., the periodic pattern 302) can be substantially aligned with a pixel pattern of the camera.

Figure 4:
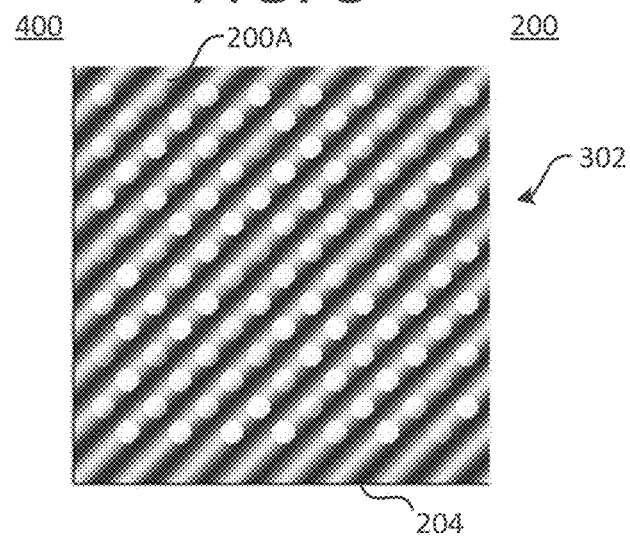
FIG. 4 shows an example of a combination of the SIM pattern of FIG. 2 and the substrate of FIG. 3.

FIG. 4 shows an example 400 of a projection of excitation illumination light of SIM fringes 200A using the SIM pattern 200 of FIG. 2 onto the substrate 300 of FIG. 3. The example 400 illustrates that the SIM pattern 200 and the periodic pattern 302 of the substrate 300 both form an angle with regard to the reference axis 204 that is about 45 degrees. The example 400 also illustrates that the SIM pattern 200 and the periodic pattern 302 both have a pitch that is about 400 nm. As a result, the SIM fringes 200A of excitation illumination light here are spatially correlated with, and substantially overlap, the linear rows of the periodic pattern 302. That is, when one of the linear rows or linear columns is illuminated by a first SIM fringe 200A of the SIM pattern 200, another one of the linear rows or linear columns that is parallel to and adjacent that linear row or linear column is also illuminated by a second, adjacent SIM fringe 200A of the SIM pattern 200. This situation can result in increased crosstalk between the adjacent linear rows and/or linear columns of the periodic pattern 302.

The result, in the example 400, is that substantially all of the wells in the substrate 300 (e.g., a nanowell in a flow cell) are illuminated by the SIM fringes 200A from the SIM pattern 200. The resulting image of the emissions from the fluorescent tags associated with the samples contained in the wells may then be the same as is obtained using wide field illumination. That is, the projected SIM fringes 200A would then not be providing any enhanced resolution by projecting some excitation illumination on a subset of wells or parts of wells and blocking excitation illumination from a subset of other wells or parts of wells. For example, if one captures six images of emissions from the fluorescent tags associated with the sample at the substrate 300, using two modulation angles and three pattern phases at each of the modulation angles, some or all of the six images may look like wide field images with different net intensities (depending on whether the well center and the illumination peaks are overlapping). The resulting SIM reconstruction may be less effective to distinguish or differentiate adjacent wells. The situation where the SIM pattern 200 overlaps some of the linear rows (or linear columns) of the periodic pattern 302 can be referred to as aliasing Where the SIM pattern 200 and the linear rows (or linear columns) of the periodic pattern 302 completely overlap with each other can be referred to as total aliasing. Systems and techniques described herein can reduce or eliminate the undesired occurrence of aliasing and/or total aliasing.

Figure 5:
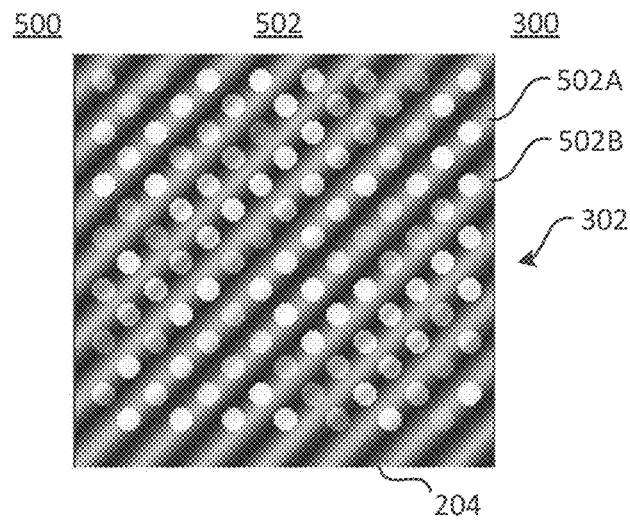
FIG. 5 shows an example of a combination of a SIM pattern and the substrate of FIG. 3 where a pitch of the SIM pattern has been selected based on a pitch of the periodic pattern of the substrate.

FIG. 5 shows an example 500 of projection of excitation illumination light of SIM fringes using a SIM pattern 502 onto the substrate 300 of FIG. 3 where a pitch of the SIM pattern 502 has been selected based, at least in part, on a pitch of the periodic pattern 302 of the substrate 300. The SIM pattern 502 can be used with one or more other examples described elsewhere herein.

At least one aspect of the SIM pattern 502 can be different than a corresponding aspect of the periodic pattern 302. Here, the SIM pattern 502 and the periodic pattern 302 can have the same angle relative to the reference axis 204. For example, the angle can be about 45 degrees. However, the pitch of the SIM pattern 502 can be different than a pitch of the periodic pattern 302. Here, the SIM pattern 502 comprises SIM fringes that appear as relatively lighter bands against the background of the substrate 300. The SIM fringes include a first SIM fringe 502A and a second SIM fringe 502B, wherein the first SIM fringe 502A is adjacent and parallel to the second SIM fringe 502B. In some implementations, the pitch of the SIM pattern 502, shown in this example as the distance between the first and second SIM fringes 502A-502B, can be selected based, at least in part, on the pitch of the periodic pattern 302. For example, the pitch of the SIM pattern 502 demonstrated as the distance between the first and second SIM fringes 502A-502B can be selected to be greater than the pitch of the periodic pattern 302. As another example, the pitch of the SIM pattern 502 demonstrated as the distance between the first and second SIM fringes 502A-502B can be selected to be smaller than the pitch of the periodic pattern 302. In some implementations, the pitch of the SIM pattern 502 can be between about 200 nanometers, inclusive, and 1600 nanometers, inclusive. Here, the pitch of the SIM pattern 502 is about 479 nm, which is greater than the about 400 nm pitch of the periodic pattern 302 of the substrate 300. In some implementations, the pitch of the SIM pattern 502 can be selected, or changed, by way of configuring a light-structuring component of a SIM system. For example, a grating can be chosen for the SIM system that has a particular spacing corresponding to the intended pitch of the SIM pattern.

The illumination of the substrate 300 in the example 500 may result in reduced aliasing when compared to that in the example 400 due to the selection of the pitch for the SIM pattern 502. In some implementations, one linear row of the periodic pattern 302 may be illuminated by the first SIM fringe 502A. Another linear row that is parallel to and adjacent the just-mentioned linear row may not currently be illuminated or only partially illuminated. For example, the second SIM fringe 502B may illuminate none or only a part of the latter linear row. As such, the amount of crosstalk between the emissions of the sample in these linear rows can be reduced or eliminated. The reconstructed image from several SIM images can therefore be improved, such as by allowing a greater resolution to be achieved with reduced aliasing.

Figure 6:
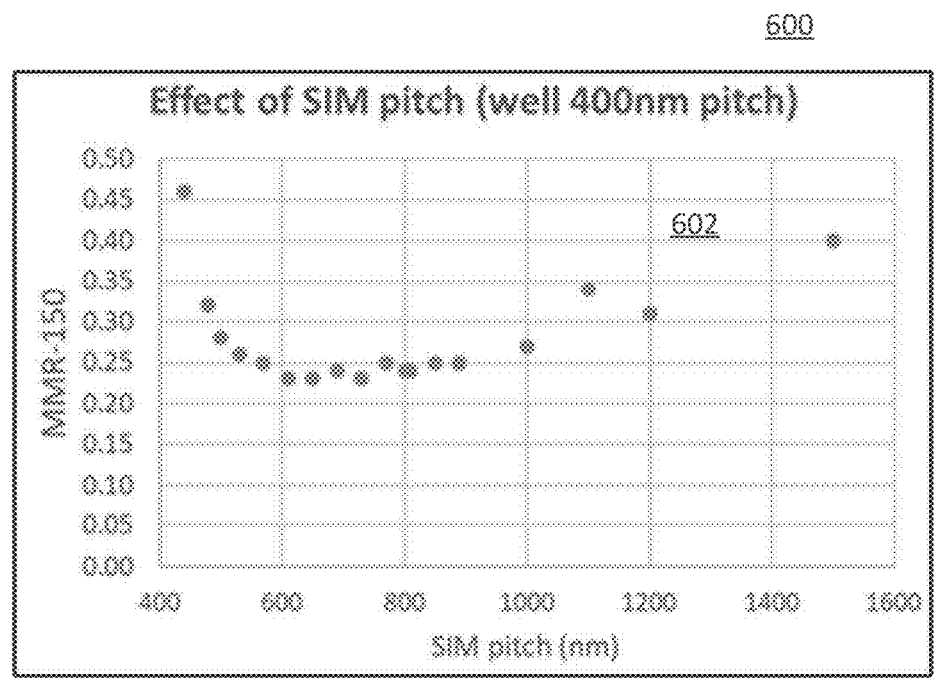
FIG. 6 shows a diagram with examples of an effect of SIM pattern pitch on sequencing error.

FIG. 6 shows a diagram 600 with examples of an effect of SIM pattern pitch on sequencing error. These examples relate to sequencing of genetic material by way of fluorescence analysis with a SIM system. The diagram 600 can be used with one or more other examples described elsewhere herein.

The diagram 600 indicates an error rate with reference to the vertical axis as a function of SIM pitch indicated with reference to the horizontal axis (e.g., in nm). The error rate is here represented by data 602. The error rate can be any metric indicating the rate of the errors that occur in the sequencing, including, but not limited to, a mismatch rate ("MMR"). In some implementations, the mismatch rate is a predefined metric made available by the system that provides sequencing analysis. For example, the mismatch rate can be defined as the number of aligned reads having a specific mismatch pattern divided by the total number of aligned reads. The diagram 600 relates to sequencing errors occurring when analyzing a substrate (e.g., a flow cell) having wells spaced apart by about 400 nm.

The data 602 in the diagram 600 shows that the SIM pattern pitch has an effect on the sequencing error. A lower error rate is demonstrated to occur when the SIM pattern pitch is between about 600 nm and about 800 nm. For example, the pattern pitch can be between about 650 nm and about 750 nm. This range includes SIM pattern pitches that are about 1.5 and about 2 times the pitch of the periodic pattern of the substrate. For example, the pattern pitch can be between about 1.65 and about 1.85 times the pitch of the periodic pattern of the substrate. The relatively lower error rate can at least in part follow because when one linear row of wells is illuminated, the next row of wells on the substrate may not be illuminated, or may be less illuminated. Therefore, the fluorescent crosstalk from the un- or less-illuminated row of wells is reduced.

FIG. 7 shows an example 700 of projection of excitation illumination light of SIM fringes using a SIM pattern 702 onto the substrate 300 of FIG. 3 where a modulation angle of the SIM pattern 702 has been offset relative to the angle of the periodic pattern 302 of the substrate 300. The SIM pattern 702 can be used with one or more other examples described elsewhere herein.

The SIM pattern 702 comprises SIM fringes, including a first SIM fringe 702A and a second SIM fringe 702B. The substrate 300 here includes samples, including a sample 704A, a sample 704B, and a sample 704C. In some implementations, the samples 704A-704C can be positioned at wells that make up the periodic pattern 302 of the substrate 300. For example, the wells can be nanowells. The linear rows and linear columns of the periodic pattern 302 form an angle with regard to the reference axis 204. For example, the angle can be about 45 degrees. The SIM fringes of the SIM pattern 702, on the other hand, can form a different angle with regard to the reference axis 204 than the linear rows and linear columns of the periodic pattern 302. For example, the angle of the SIM fringes can be greater than or less than the angle of the linear rows and linear columns of the periodic pattern 302. In some implementations, the angle of the SIM fringes of SIM pattern 702 can be selected to be offset by +10 degrees, inclusive, to +80 degrees, inclusive, relative to the angle of the periodic pattern 302 with regard to the reference axis 204 or the angle of the SIM fringes of SIM pattern 702 can be selected to be offset by −10 degrees, inclusive, to −80 degrees, inclusive, relative to the angle of the periodic pattern 302 with regard to the reference axis 204. Here, an angle of the SIM pattern has been offset by about 20 degrees relative to the angle of the periodic pattern 302 with regard to the reference axis 204. For example, the SIM pattern can be selected to have an angle of about 25 degrees with regard to the reference axis 204 while the periodic pattern 302 is selected to have an angle of about 45 degrees with regard to the reference axis 204.

The SIM pattern 702 can have any of multiple values as the pitch between adjacent ones of the SIM fringes. In some implementations, the pitch of the SIM pattern 702 can be between about 200 nanometers, inclusive, and 1600 nanometers, inclusive. In some implementations, the pitch of the SIM pattern 702 can be selected to be different from the pitch of the periodic pattern 302 of the substrate 300. For example, the SIM pattern 702 can have a pitch of about 479 nm. The periodic pattern 302 can have any of multiple values as the pitch between adjacent linear rows, or adjacent linear columns. In some implementations, the pitch of the periodic pattern 302 can be between about 200 nanometers, inclusive, and 1600 nanometers, inclusive. For example, the periodic pattern 302 can have a pitch of about 400 nm while the pitch of the SIM pattern 702 has a pitch of about 479 nm. In some implementations, both the angle and pitch can be selected for the SIM pattern 702 can be selected to be different from the angle and pitch of the periodic pattern 302 of the substrate 300.

The example 700 illustrates that the crosstalk resulting from emissions of fluorescent tags associated with neighboring samples (e.g., in wells of a flow cell) can be reduced by relative rotation between the SIM pattern 702 and the linear rows, or linear columns, of the periodic pattern 302. Here, when one center well is relatively well illuminated by the SIM pattern 702, the neighboring wells (e.g., in the same linear row or linear column) are not illuminated or illuminated to a lesser extent. This can reduce crosstalk between neighbor wells. For example, the sample 704A is shown as illuminated by the first SIM fringe 702A. The sample 704B is adjacent the sample 704A (e.g., the samples 704A-704B are situated in wells that are in the same linear column). The sample 704B, on the other hand, is partially illuminated by the SIM pattern 702 (e.g., the sample 704B is less illuminated than the sample 704A) when the sample 704A is illuminated. As another example, the sample 704C is also adjacent the sample 704A (e.g., the samples 704A and 704C are situated in wells that are in the same linear row). The sample 704C, on the other hand, is also partially illuminated by the SIM pattern 702 (e.g., the sample 704C is less illuminated than the sample 704A) when the sample 704A is illuminated. As a result, crosstalk based on emissions from fluorescent tags associated with samples 704B and 704C for the emissions from the fluorescent tags associated with sample 704A can be reduced or eliminated.

Table 1 below shows an example of results regarding relative rotation of SIM pattern and periodic pattern on a substrate having a periodic pattern of flow cells with a substrate pattern pitch of about 300 nm. Here, the periodic pattern of the flow cells forms an angle with regard to an arbitrary reference axis that is about 45 degrees. For example, the arbitrary reference axis can correspond to a camera pixel direction (e.g., vertical or horizontal). In some implementations, the angle of the periodic pattern of the flow cells can be between about 0 degrees, inclusive, and 90 degrees, inclusive. The SIM angles exemplified in Table 1 are measured relative to the reference axis. The pitch of the SIM pattern can be about 470-490 nm (e.g., about 479 nm). In some implementations, the pitch of the SIM pattern can be between about 200 nanometers, inclusive, and 1600 nanometers, inclusive.

TABLE 1

| Substrate pitch 300 nm | % pass filter (% PF) | Error rate (150 cycles) |
|---|---|---|
| SIM angle 45 degrees | 74.7% | 0.69% |
| SIM angle 25 degrees | 82.6% | 0.22% |

Table 1 includes two metrics that may be affected by the relative angle. The first metric is the percentage of clusters that pass a filter in the sequencing analysis, sometimes referred to as % PF. For example, the pass-filter percentage can be a predefined metric made available by the system that provides sequencing analysis. Here, Table 1 indicates that with a 20-degree offset in the angle of the SIM pattern, a higher proportion of clusters (82.6%) pass the filter compared with the % PF without offset (74.7%). That is, providing an offset can increase the percentage of clusters that pass the filter.

The second metric is an error rate, which can reflect the rate of errors that occur in the sequencing. For example, the error rate was here determined based on 150 cycles. Here, Table 1 indicates that with a 20-degree offset in the angle of the SIM pattern, a lower error rate (0.22%) can be obtained with an offset compared with the error rate without offset (0.69%). That is, providing an offset can decrease the error rate.

Some examples above have mentioned a substrate having a periodic pattern that is a square pattern. In some implementations, the SIM pattern can be applied in one or more separate angles (sometimes referred to as the modulation angle(s)), and at the modulation angle(s) one or more pattern phases can be used. For example, two modulation angles can be used, and at each angle three pattern phases can be applied. Other approaches can be used. Any of such approaches can be applied with another type of substrate pattern. For example, the substrate pattern can include a hexagon pattern (e.g., a pattern where three hexagons meet at each vertex). As another example, three or more modulation angles can be used.

FIGS. 8A-8C show examples 800, 800', and 800" of providing an offset to a modulation angle of a SIM pattern to form an offset modulation angle. The examples 800, 800', and/or 800" can be used with one or more other examples described elsewhere herein.

The examples 800, 800', and 800" are shown relative to a reference axis 802. In some implementations, the reference axis 802 can be analogous to the reference axis 204 (FIGS. 2-5, and 7). For example, the reference axis 802 can be chosen as an arbitrary reference for purposes of defining the angle of a SIM pattern.

The example 800 shows that a modulation angle 804 is indicated relative to the reference axis 802. The modulation angle 804 can be measured in a counterclockwise direction from the rightmost end of the reference axis 802. In some implementations, the modulation angle 804 corresponds to how much the SIM pattern is rotated about the optical axis of the SIM system when a particular illumination is being performed. SIM imaging may use two or more such modulation angles in capturing SIM images. For example, before the development of the present subject matter, SIM imaging may use a 45-degree angle as one of the modulation angles. Accordingly, the modulation angle 804 is shown as being about 45 degrees in the present example for illustration purposes.

The example 800 also shows that an offset 806 is provided to the modulation angle 804 to form an offset modulation angle 808. In the example 800, the offset 806 is defined in a clockwise direction from the modulation angle 804. In some implementations, providing the offset 806 can correspond to changing from using the SIM pattern 502 (FIG. 5) to using the SIM pattern 702 (FIG. 7). As a result of the offset 806 being provided, the offset modulation angle 808 does not correspond to any symmetry axis of the periodic pattern of the substrate holding the sample. For example, the SIM pattern 702 in FIG. 7 does not correspond to (e.g., is not parallel with) any of the linear rows or linear columns of the periodic pattern 302, which are symmetry axes of the periodic pattern 302.

The offset 806 can be an angle of any numerical value. Providing the offset can comprise rotating the SIM pattern about its optical axis in either direction (e.g., by adjusting a grating, or another component of a light-structuring component) by an amount corresponding to that angle. The offset 806 angle of SIM fringes of a SIM pattern can be selected to ±10 degrees, inclusive, to ±80 degrees, inclusive, relative to an angle of the periodic pattern of a substrate with regard to the reference axis 802. For example, the offset 806 is here about 20 degrees from the 45-degree angle of the modulation angle 804, so the offset modulation angle 808 is about 25 degrees. As such, the example 800 corresponds to the examples described above with reference to Table 1.

The example 800' shows that a modulation angle 804' is indicated relative to the reference axis 802. The modulation angle 804' can be measured in a counterclockwise direction from the rightmost end of the reference axis 802. In some implementations, the modulation angle 804' corresponds to how much the SIM pattern is rotated about the optical axis of the SIM system when a particular illumination is being performed. SIM imaging may use two or more such modulation angles in capturing SIM images. Here, the example 800' also shows that a modulation angle 804" is indicated relative to the reference axis 802. The modulation angle 804" can be measured in a counterclockwise direction from the rightmost end of the reference axis 802. In some implementations, the modulation angle 804" corresponds to how much the SIM pattern is rotated about the optical axis of the SIM system when another particular illumination is being performed. More or fewer modulation angles than shown can be used.

The example 800' also shows that an offset 806' is provided to the modulation angle 804' to form an offset modulation angle 808'. In the example 800', the offset 806' is defined in a counterclockwise direction from the modulation angle 804'. In some implementations, providing the offset 806' can correspond to changing from using the SIM pattern 502 (FIG. 5) to instead using the SIM pattern 702 (FIG. 7). As a result of the offset 806' being provided, the offset modulation angle 808' does not correspond to any symmetry axis of the periodic pattern of the substrate holding the sample. For example, the SIM pattern 702 in FIG. 7 does not correspond to (e.g., is not parallel with) any of the linear rows or linear columns of the periodic pattern 302, which are symmetry axes of the periodic pattern 302.

The example 800' also shows that an offset 806" is provided to the modulation angle 804" to form an offset modulation angle 808". In some implementations, providing the offset 806" can correspond to changing from using the SIM pattern 502 (FIG. 5) to instead using the SIM pattern 702 (FIG. 7). As a result of the offset 806" being provided, the offset modulation angle 808" does not correspond to any symmetry axis of the periodic pattern of the substrate holding the sample. For example, the SIM pattern 702 in FIG. 7 does not correspond to (e.g., is not parallel with) any of the linear rows or linear columns of the periodic pattern 302, which are symmetry axes of the periodic pattern 302.

Each of the offsets 806, 806', and/or 806" can be an angle of any numerical value. Providing the offsets 806, 806', and/or 806" can comprise rotating the SIM pattern about its optical axis in either direction (e.g., by adjusting a grating, or another component of a light-structuring component) by an amount corresponding to that angle.

Referring now also to FIG. 8C, the example 800" illustrates that an offset modulation angle can be formed within an offset range 810 that includes angles smaller than a modulation angle 804". That is, the offset can be defined in a clockwise direction or a counterclockwise direction relative to the modulation angle 804", and can have any of multiple values within the offset range 810. In some implementations, the offset range 810 can include angles that are offset equal to, or greater than, about 5-15 degrees from the modulation angle 804". For example, a smallest offset angle within the offset range 810 can be about 10 degrees from the modulation angle 804". In some implementations, the offset range 810 can include angles that are offset equal to, or less than, about 25-35 degrees from the modulation angle 804". For example, a greatest offset angle within the offset range 810 can be about 30 degrees from the modulation angle 804".

The example 800" also illustrates that an offset modulation angle can be formed within an offset range 810' that includes angles greater than the modulation angle 804". In some implementations, the offset range 810' can include angles that are offset equal to, or greater than, about 5-15 degrees from the modulation angle 804". For example, a smallest offset angle within the offset range 810' can be about 10 degrees from the modulation angle 804". In some implementations, the offset range 810' can include angles that are offset equal to, or less than, about 25-35 degrees from the modulation angle 804". For example, a greatest offset angle within the offset range 810' can be about 30 degrees from the modulation angle 804".

FIGS. 9A-9B show examples of images 900 and 910 captured without (FIG. 9A) and with (FIG. 9B) an offset on a modulation angle. The images 900 and/or 910 can be used with one or more other examples described elsewhere herein. The images 900 and 910 in this example are simulations generated based on sample data, the sample data being the same in both images. For example, the images 900 and 910 can be generated separately using the same input conditions except the SIM angle (e.g., the sample data for the images 900 and 910 can be statistically the same). The images 900 and 910 can be captured when the periodic pattern of the substrate has a pitch of about 275 nm. In some implementations, the image 900 may be captured with the SIM pattern forming a 45-degree angle with regard to a reference axis. For example, the image 900 can be similar to the first scenario listed in Table 1 above (e.g., without providing an offset to the modulation angle). The image 900 may be the SIM reconstruction of multiple images of fluorescence captured from a sample and includes a variety of relatively lighter and darker areas, including a lighter image portion 902A and a darker image portion 902B. Analysis can be performed of the lighter image portion 902A and/or the darker image portion 902B, among others, to obtain information about the sample. The usefulness of each of the lighter image portion 902A and the darker image portion 902B in such analysis in part depends on the amount of crosstalk that has affected the image content (e.g., the fluorescence) that makes up the respective lighter image portion 902A and the darker image portion 902B. For example, Table 1 above indicates the % PF and error rate that can be associated with the SIM images generated without benefit of the present subject matter.

In some implementations, the image 910 may be captured with the SIM pattern forming a 25-degree angle with regard to a reference axis. For example, the image 910 can be similar to the second scenario listed in Table 1 above (e.g., with providing an offset to the modulation angle). The image 910 may be the SIM reconstruction of multiple images of fluorescence captured from a sample and includes a variety of relatively lighter and darker areas, including a lighter image portion 904A and a darker image portion 904B. Analysis can be performed of the lighter image portion 904A and/or the darker image portion 904B, among others, to obtain information about the sample. The usefulness of each of the lighter image portion 904A and the darker image portion 904B in such analysis in part depends on the amount of crosstalk that has affected the image content (e.g., the fluorescence) that makes up the respective lighter image portion 904A and the darker image portion 904B. For example, Table 1 above indicates that the % PF and error rate that can be associated with an SIM image can be improved according to the present subject matter.

Table 2 below shows an example of results relating to analysis of samples based on the images 900 and 910.

TABLE 2

| Metric | 45 degrees (image 900) | 25 degrees (image 910) |
| --- | --- | --- |
| % PF | 61.30 | 83.54 |
| % Align | 97.83 | 99.85 |
| MMR-150 | 1.524 | 0.266 |

Table 2 includes three metrics that may be affected by the relative angle. The first metric is the pass filter percentage, or % PF. The second metric is the align percentage, sometimes referred to as % Align. For example, the % Align can reflect the percentage of the passing-filter clusters that aligned to the genome being sequenced. The third metric is a mismatch rate (e.g., MMR-150). Here, Table 2 indicates that with a 20-degree offset in the angle of the SIM pattern, a higher proportion of clusters (83.54%) pass the filter compared with the % PF without offset (61.30%). Here, Table 2 also indicates that with a 20-degree offset in the angle of the SIM pattern, a higher proportion of clusters (99.85%) are aligned compared with the % Align without offset (97.83%). Here, Table 2 also indicates that with a 20-degree offset in the angle of the SIM pattern, a lower mismatch rate (0.266) can be achieved compared with the mismatch rate without offset (1.524). That is, providing an offset can increase the quality of the analysis.

FIGS. 10A-10B show other examples of images 1000 and 1010 captured without (FIG. 10A) and with (FIG. 10B) an offset on a modulation angle. The images 1000 and/or 1010 can be used with one or more other examples described elsewhere herein. The images 1000 and 1010 in this example are simulations generated based on sample data, the sample data being the same in both images. For example, the images 1000 and 1010 can be generated separately using the same input conditions except the SIM angle (e.g., the sample data for the images 1000 and 1010 can be statistically the same). The images 1000 and 1010 can be captured when the periodic pattern of the substrate has a pitch of about 250 nm. For example, other than the substrate pitch (e.g., about 250 nm compared to about 275 nm) the sample data of the images 1000 and 1010 may correspond to the sample data of the images 900 and 910 in FIGS. 9A-9B. In some implementations, the image 1000 may be captured with the SIM pattern forming a 45-degree angle with regard to a reference axis. For example, the image 1000 can be similar to the first scenario listed in Table 1 above (e.g., without providing an offset to the modulation angle). The image 1000 may be the SIM reconstruction of multiple images of fluorescence captured from a sample and includes a variety of relatively lighter and darker areas, including a lighter image portion 1002A and a darker image portion 1002B. Analysis can be performed of the lighter image portion 1002A and/or the darker image portion 1002B, among others, to obtain information about the sample. The usefulness of each of the lighter image portion 1002A and the darker image portion 1002B in such analysis in part depends on the amount of crosstalk that has affected the image content (e.g., the fluorescence) that makes up the respective lighter image portion 1002A and the darker image portion 1002B. For example, Table 1 above indicates the % PF and error rate that can be associated with the SIM images generated without benefit of the present subject matter.

In some implementations, the image 1010 may be captured with the SIM pattern forming a 25-degree angle with regard to a reference axis. For example, the image 1010 can be similar to the second scenario listed in Table 1 above (e.g., with providing an offset to the modulation angle). The image 1010 may be the SIM reconstruction of multiple images of fluorescence captured from a sample and includes a variety of relatively lighter and darker areas, including a lighter image portion 1004A and a darker image portion 1004B. Analysis can be performed of the lighter image portion 1004A and/or the darker image portion 1004B, among others, to obtain information about the sample. The usefulness of each of the lighter image portion 1004A and the darker image portion 1004B in such analysis in part depends on the amount of crosstalk that has affected the image content (e.g., the fluorescence) that makes up the respective lighter image portion 1004A and the darker image portion 1004B. For example, Table 1 above indicates that the % PF and error rate that can be associated with an SIM image can be improved according to the present subject matter.

Table 3 below shows an example of results relating to the images 1000 and 1010.

TABLE 3

| Metric | 45 degrees (image 1000) | 25 degrees (image 1010) |
|---|---|---|
| % PF | 34.97 | 73.25 |
| % Align | 91.27 | 99.51 |
| MMR-150 | 3.134 | 0.784 |

Table 3 includes three metrics that may be affected by the relative angle. The first metric is the pass filter percentage, or % PF. The second metric is the align percentage, sometimes referred to as % Align. For example, the % Align can reflect the percentage of the passing-filter clusters that aligned to the genome being sequenced. The third metric is a mismatch rate (e.g., MMR-150). Here, Table 3 indicates that with a 20-degree offset in the angle of the SIM pattern, a higher proportion of clusters (73.25%) pass the filter compared with the % PF without offset (34.97%). Here, Table 3 also indicates that with a 20-degree offset in the angle of the SIM pattern, a higher proportion of clusters (99.51%) are aligned compared with the % Align without offset (91.27%). Here, Table 3 also indicates that with a 20-degree offset in the angle of the SIM pattern, a lower mismatch rate (0.784) can be achieved compared with the mismatch rate without offset (3.134). That is, providing an offset can increase the quality of the analysis.

That is, an offset in the angle of the SIM pattern can provide a useful improvement in analysis using a SIM system. This can be beneficial when the substrate has a periodic pattern with a relatively small pitch. For example, when the camera pixel spacing is relatively low (e.g., on the order of 220-230 nm) it may not be possible to visually observe the SIM patterns. This can occur for periodic patterns (e.g., flow cells) with a pitch of less than about 300 nm, to name just one example. However, the SIM reconstruction may still be carried out in a reliable way to provide useful results, due to the reduction in fluorescence crosstalk.

Figure 11:
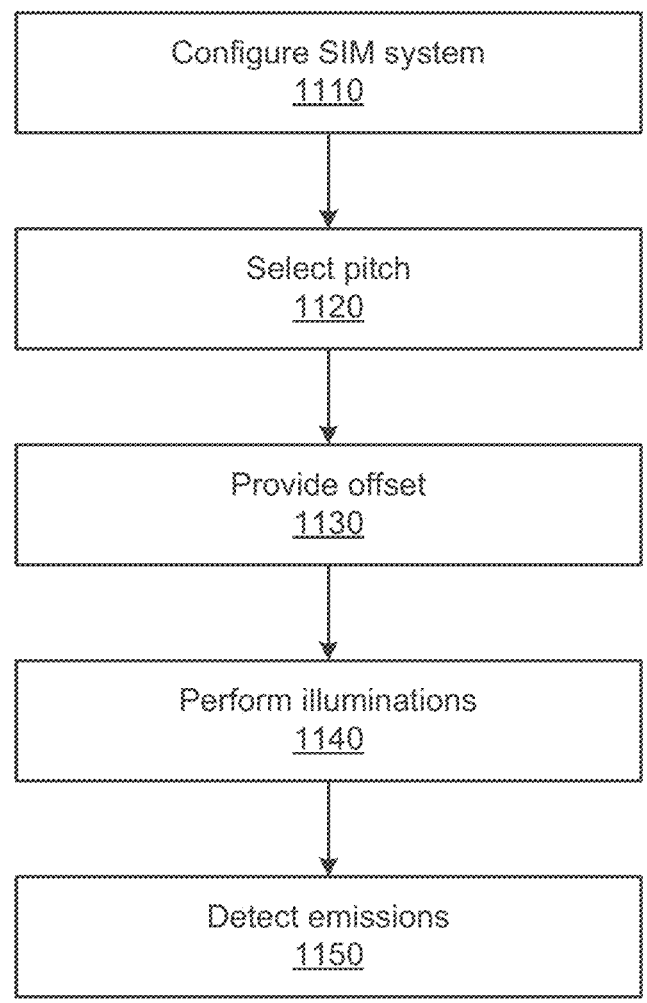
FIG. 11 shows an example of a method.

FIG. 11 shows an example of a method 1100. The method 1100 can be used with one or more other examples described elsewhere herein. More or fewer operations than shown can be performed. Two or more operations can be performed in a different order unless otherwise indicated.

Figure 14:
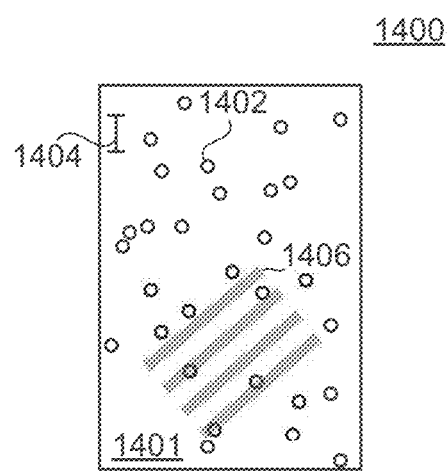
FIG. 14 shows an example of a substrate having a random pattern.

At operation 1110, the method 1100 can involve configuring a SIM system (e.g., the system 100 in FIG. 1) for performing illuminations of a sample at a substrate (e.g., the substrate 300 in FIG. 3) having a substrate pattern (e.g., the periodic pattern 302 in FIG. 3 or the random pattern 1401 in FIG. 14). For example, a sample can be prepared where the sample material is associated with fluorescent tags that will generate fluorescent emissions in response to illumination with excitation light.

At operation 1120, the method 1100 can involve selecting a pitch for a SIM pattern (e.g., the SIM pattern 502 in FIG. 5 or the SIM pattern 702 in FIG. 7) of the SIM system based on at least one characteristic of the substrate pattern. In some implementations, the pitch of the SIM pattern can be between about 200 nanometers, inclusive, and 1600 nanometers, inclusive. When the substrate pattern is a periodic pattern, the pitch of the SIM pattern can be selected to be greater or smaller than the pitch of the periodic pattern. As another example, when the substrate pattern is a random pattern, the pitch of the SIM pattern can be selected based on a fine structure resolution of the random pattern of the substrate.

At operation 1130, the method 1100 can involve providing an offset (e.g., the offset 806, 806', and/or 806") to each of the modulation angles of the SIM system to form offset modulation angles (e.g., the offset modulation angles 808, 808', and/or 808"). In some implementations, the offset can be selected to ±10 degrees, inclusive, to ±80 degrees, inclusive, relative to the modulation angle. For example, the modulation angle can be defined with regard to a reference axis. The offset can be defined in a clockwise direction, or in a counterclockwise direction, relative to the modulation angle. The operation 1130 can be performed when the substrate pattern is a periodic pattern. None of the offset modulation angles may corresponding to (e.g., align with) an angle of a symmetry axis of the periodic pattern.

At operation 1140, the method 1100 can involve performing the illuminations (e.g., as shown in FIGS. 5 and/or 7) of the sample at the substrate with the SIM pattern. For example, the illuminations are performed using one or more lasers, and/or one or more mode LEDs.

At operation 1150, the method 1100 can involve detecting emissions (e.g., the images 910 and/or 1010) that the sample generates in response to the illuminations. For example, fluorescent emissions generated by fluorescent tags associated with the sample material can be detected.

Figure 12:
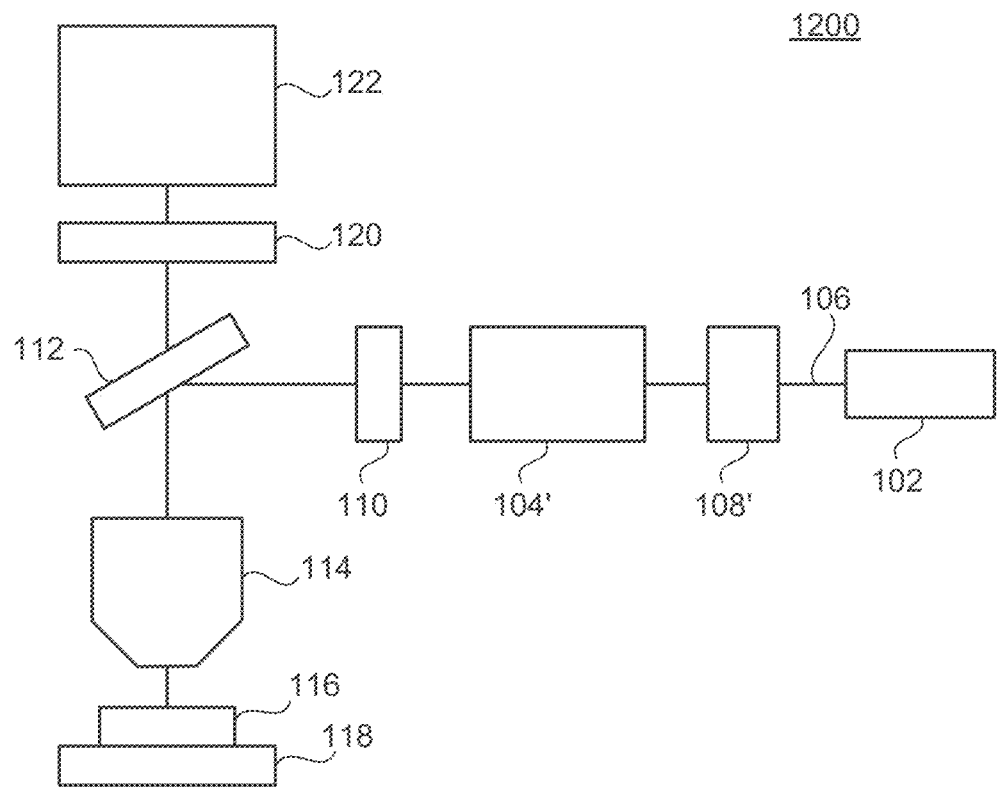
FIG. 12 is a schematic view of an example system that can facilitate SIM and in which a phase selector is placed before a reflective component.

FIG. 12 schematically shows another example of a system 1200 that can facilitate SIM. The system 1200 can be used in combination with one or more other examples described herein. Some components in this and other examples are shown conceptually as a block or other generic component; such component(s) can be implemented in form of one or more separate or integrated components so as to perform the indicated function(s). Components corresponding to those of the system 100 (FIG. 1) that are not explicitly mentioned can serve the same or a similar role in the system 1200.

The system 1200 includes a phase selector 108' positioned before a light-structuring component 104'. In some implementations, the phase selector 108' can receive the beam 106 from the light source 102. The phase selector 108' can provide phase-selected light to the light-structuring component 104'. The light-structuring component 104' can generate structured light and provide the structured light to a subsequent component in the system 1200. In some implementations, the subsequent component is the projection lens 110. Other approaches can be used.

In some implementations, the stage 118 can translate the sample 116 a distance relative to stationary light fringes to accomplish phase selection (e.g., using a piezo actuator in the stage 118). For example, the phase selector 108' can then be bypassed in, or eliminated from, the system 1200.

Figure 13:
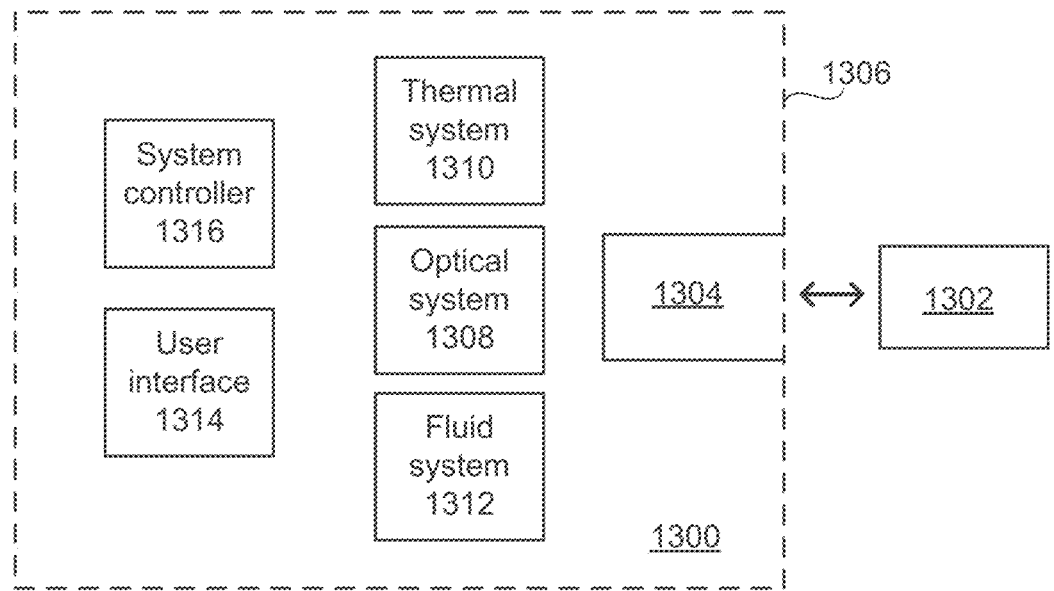
FIG. 13 is a schematic view of an example system that can be used for biological and/or chemical analysis; the system of FIG. 1 can be a part of the system in FIG. 13.

FIG. 13 is a schematic view of an example system 1300 that can be used for biological and/or chemical analysis. Systems and/or techniques described herein, including, but not limited to, the system 100 (FIG. 1), the system 1200 (FIG. 12), and/or the method 1100 (FIG. 11), can be part of the system 1300 in some implementations. The system 1300 can operate to obtain any information or data that relates to at least one biological and/or chemical substance. In some implementations, a carrier 1302 supplies material to be analyzed. For example, the carrier 1302 can include a cartridge or any other component holding the material. In some implementations, the system 1300 has a receptacle 1304 to receive the carrier 1302 at least during the analysis. The receptacle 1304 can form an opening in a housing 1306 of the system 1300. For example, some or all components of the system 1300 can be within the housing 1306.

The system 1300 can include an optical system 1308 for biological and/or chemical analysis of the material(s) of the carrier 1302. The optical system 1308 can perform one or more optical operations, including, but not limited to, illumination and/or imaging of the material(s). For example, the optical system 1308 can include any or all systems described elsewhere herein. As another example, the optical system 1308 can perform any or all operations described elsewhere herein.

The system 1300 can include a thermal system 1310 for providing thermal treatment relating to biological and/or chemical analysis. In some implementations, the thermal system 1310 thermally conditions at least part of the material(s) to be analyzed and/or the carrier 1302.

The system 1300 can include a fluid system 1312 for managing one or more fluids relating to biological and/or chemical analysis. In some implementations, the fluid(s) can be provided for the carrier 1302 or its material(s). For example, fluid can be added to and/or removed from the material of the carrier 1302.

The system 1300 includes a user interface 1314 that facilitates input and/or output relating to biological and/or chemical analysis. The user interface can be used to specify one or more parameters for the operation of the system 1300 and/or to output results of biological and/or chemical analysis, to name just a few examples. For example, the user interface 1314 can include one or more display screens (e.g., a touchscreen), a keyboard, and/or a pointing device (e.g., a mouse or a trackpad).

The system 1300 can include a system controller 1316 that can control one or more aspects of the system 1300 for performing biological and/or chemical analysis. The system controller 1316 can control the receptacle 1304, the optical system 1308, the thermal system 1310, the fluid system 1312, and/or the user interface 1314. The system controller 1316 can include at least one processor and at least one storage medium (e.g., a memory) with executable instructions for the processor.

FIG. 14 shows an example of a substrate 1400 having a random pattern 1401. The substrate 1400 can be used with one or more other examples described elsewhere herein. The random pattern 1401 of the substrate 1400 is here formed by a random or pseudo-random distribution of wells 1402 on the surface. The wells 1402 are here schematically repre-sented using circles, and can have any shape. In some implementations, the wells 1402 can be nanowells or another structure suitable for holding a sample. For example, the sample can be a genetic material (not shown) distributed to some or all of the wells 1402 of the random pattern 1401.

With the substrate 1400 provided with the random pattern 1401, the optical system can obtain a specific resolution of fine structures on the surface of the substrate 1400. In some implementations, there can be defined or determined a resolution 1404 of fine structures of the random pattern 1401 on the substrate 1400. For example, the resolution 1404 can be expressed as a length corresponding to the minimum distance between two distinguishable features at the substrate 1400.

The optical system can perform SIM analysis of the sample(s) at the substrate 1400. In doing so, the optical system can illuminate the substrate 1400 with one or more SIM patterns. In some implementations, a SIM pattern 1406 can be generated. The SIM pattern 1406 is here schematically represented as four parallel bands of light incident on the surface of the substrate 1400. Other approaches can be used. For example, the SIM pattern 1406 can have more or fewer light bands, and/or can be oriented in one or more other directions relative to the substrate 1400. A distance between the bands of the SIM pattern 1406 can be referred to as a pitch of the SIM pattern 1406. In some implementations, the pitch of the SIM pattern 1406 can be selected based on a characteristic of the random pattern 1401 of the substrate 1400. For example, the pitch of the SIM pattern 1406 can be selected based on a fine structure resolution of the random pattern 1401 of the substrate 1400. In some implementations, the pitch of the SIM pattern 1406 can be about the same order of magnitude as the resolution 1404. For example, the pitch of the SIM pattern 1406 can be larger than, such as about a few times greater than, the resolution 1404 (e.g., when the resolution 1404 is about 100 nm, the pitch of the SIM pattern 1406 can be about a few hundred nm). If the pitch of the SIM pattern 1406 is too large relative to the resolution 1404, the optical system may not be able to resolve the fine structure of the substrate 1400.

Figure 15:
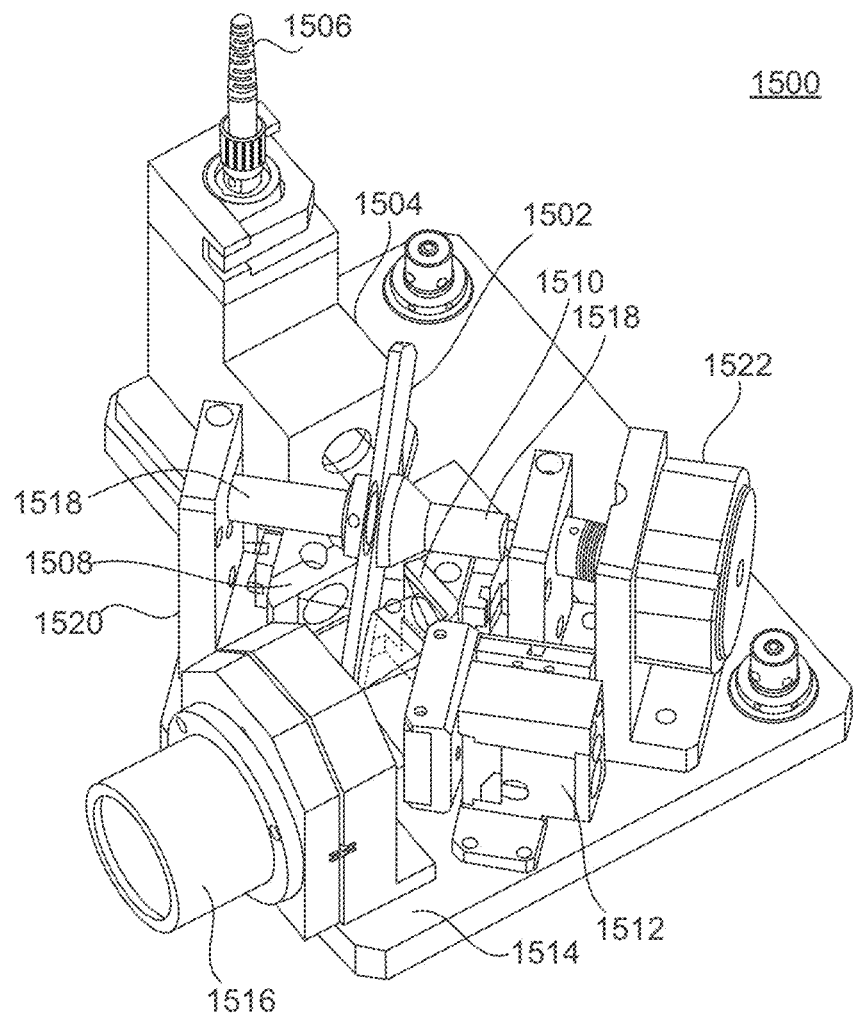
FIG. 15 shows an example of a rotating inline grating system (RIGS) having a rotatable mirror that may be implemented as part of the system of FIG. 1.

FIG. 15 shows an example of a system 1500 having a rotatable mirror 1502. The system 1500 can be used in combination with one or more other examples described herein. In some implementations, any system or technique described herein can be implemented as part of the system 1500. For example, the arrangement of one or more of the SIM patterns 200, 502, 702 can be implemented as part of the system 1500. An individual component of the system 1500 can perform a similar or identical function to a corresponding component described with reference to another example in this description.

The system 1500 includes a light source 1504. In some implementations, the light source 1504 provides light that it in turn receives through at least one fiber optic cable 1506. For example, the light source 1504 and the fiber optic cable 1506 can collectively be considered a fiber launch module.

The system 1500 includes a grating 1508 and a grating 1510. In some implementations, the grating 1508 and/or 1510 can serve as a diffractive component with regard to light from the light source 1504. For example, the grating 1508 and/or 1510 can comprise a substrate with a periodic structure, the substrate combined with a prism. The gratings 1508 and 1510 can be positioned relative to each other according to one or more arrangements. Here, the gratings 1508 and 1510 face each other in the system 1500. The gratings 1508 and 1510 can be substantially identical to each other or can have one or more differences. The size, periodicity or other spatial aspect of one of the gratings 1508 and 1510 can differ from that/those of the other. The grating orientation (i.e., the spatial orientation of the periodic structure) of one of the gratings 1508 and 1510 can differ from that/those of the other. In some implementations, the respective grating orientations of the gratings 1508 and 1510, which gratings themselves face toward each other, can be substantially perpendicular to each other or at any other angle relative to each other. In some implementations, the gratings 1508 and 1510 can be at offset positions relative to the rotatable mirror 1502. In some implementations, the gratings 1508 and/or 1510 can be in a fixed position relative to the light source 1504.

The system 1500 can include one or more components (e.g., as a phase selector 108 of FIG. 1) to facilitate phase selection with regard to the light that should be applied to a sample (e.g., to the sample 116 in FIG. 1). Here, the system 1500 includes a piezo fringe shifter 1512. In some implementations, the piezo fringe shifter 1512 can receive light from the grating 1508 and/or 1510 and can perform phase selection with regard to some or all of that light. For example, the piezo fringe shifter 1512 can be used for controlling the pattern phase of the structured light using which a particular image should be captured. The piezo fringe shifter 1512 can include a piezo actuator. For example, a piezo piston system can be used to effectuate phase selection. Other approaches can be used. For example, a tilting optical plate can be used for phase selection. For example, the system 1500 is here implemented on a board 1514, and one or more areas of the board 1514 can be tilted to accomplish phase selection. As another example, one or more of the gratings 1508 and 1510 can be moved (e.g., translated) for the phase selection, such as by a piezo actuator. Light emanating from the piezo fringe shifter 1512 is sometimes referred to as phase-selected light, to indicate that the light has been conditioned according to a particular phase selection. In some implementations, the gratings 1508 and/or 1510 can be in a fixed position relative to the light source 1504.

The system includes a projection lens 1516 that can include one or more optical components (e.g., a lens) to condition light that is received from the piezo fringe shifter 1512. For example, the projection lens 1516 can control the characteristics of the light before the light enters an objective lens (e.g., the objective lens 114 in FIG. 1).

The rotatable mirror 1502 can be used to redirect at least one beam of light toward, and/or arriving from, one or more of the gratings 1508 or 1510. The rotatable mirror 1502 can include one or more materials so as to be sufficiently reflective of the electromagnetic waves with which the sample is to be illuminated. In some implementations, the light from the light source 1504 includes a laser beam of one or more wavelengths. For example, a metal-coated mirror and/or a dielectric mirror can be used. The rotatable mirror 1502 can be double-sided. For example, the rotatable mirror 1502 can be considered double-sided if it is capable of performing reflection on at least part of both its sides (e.g., reflective at a first end for a first beam path and reflective at a second end, opposite the first end, for a second beam path).

The rotatable mirror 1502 can include an elongate member. The rotatable mirror 1502 can have any of a variety of form factors or other shape characteristics. The rotatable mirror 1502 can have a generally flat configuration. The rotatable mirror 1502 can have a substantially square or otherwise rectangular shape. The rotatable mirror 1502 can have rounded corners. The rotatable mirror 1502 can have a substantially constant thickness. The reflective surfaces of the rotatable mirror 1502 can be substantially planar.

The rotatable mirror 1502 can be supported by an axle 1518 of the system 1500. The axle 1518 can allow the rotatable mirror 1502 to be rotated about the axle 1518 in either or both directions. The axle 1518 can be made of a material with sufficient rigidity to hold and manipulate the rotatable mirror 1502, such material(s) including, but not limited to, metal. The axle 1518 can be coupled substantially at a center of the rotatable mirror 1502. For example, the rotatable mirror 1502 can have an opening at the center, or a cutout from one side that reaches the center, so as to facilitate coupling with the axle 1518. As another example, the axle 1518 can include separate axle portions that are coupled to respective faces of the rotatable mirror 1502, without the need for any opening in the rotatable mirror 1502. The axle 1518 can have at least one suspension 1520. Here, the suspension 1520 is positioned at the ends of the axle 1518 on both sides of the rotatable mirror 1502. The suspension 1520 can include a bearing or other feature that facilitates low-friction operation.

The rotatable mirror 1502 can be actuated to assume one or more positions. Any form of motor or other actuator can be used for controlling the rotatable mirror 1502. In some implementations, a stepper motor 1522 is used. The stepper motor 1522 can be coupled to the axle 1518 and be used for causing the axle 1518, and thereby the rotatable mirror 1502, to rotate and assume the desired position(s). In some implementations, the rotatable mirror 1502 rotates in the same direction toward the new positions (e.g., always clockwise, or always counterclockwise, about the rotation axis of the axle 1518). In some implementations, the rotatable mirror 1502 reciprocates between two or more positions (e.g., alternatingly clockwise or counterclockwise, about the rotation axis of the axle 1518).

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A structured illumination microscopy (SIM) system comprising:
    a light source;
    a light-structuring component to provide light from the light source with a SIM pattern for performing illuminations of a sample at a substrate having a substrate pattern, wherein a pitch of the SIM pattern is based on a characteristic of the substrate pattern; and
    an image sensor to detect emissions that the sample generates in response to the illuminations;
    wherein the SIM system is configured to rotate the SIM pattern about an optical axis into modulation angles, wherein at least one of the illuminations is performed at each of the modulation angles of the SIM pattern.

2. The SIM system of claim 1, wherein the substrate pattern includes a periodic pattern, and wherein the pitch of the SIM pattern is based on a pitch of the periodic pattern.

3. The SIM system of claim 2, wherein the pitch of the SIM pattern is greater than the pitch of the periodic pattern.

4. The SIM system of claim 3, wherein the pitch of the SIM pattern is between about 1.5 and about 2 times the pitch of the periodic pattern.

5. The SIM system of claim 2, wherein the light-structuring component includes a grating for generating the SIM pattern, the grating corresponding to the pitch of the periodic pattern.

6. The SIM system of claim 1, wherein the substrate pattern comprises nanowells formed at the substrate.

7. The SIM system of claim 6, wherein the substrate pattern comprises that the nanowells are arranged in a square array.

8. The SIM system of claim 7, wherein the square array has the nanowells arranged in linear rows and linear columns, wherein the linear rows are substantially perpendicular to the linear columns.

9. The SIM system of claim 8, wherein a first linear row or linear column is illuminated by the SIM pattern, wherein a second linear row or linear column is parallel to and adjacent the first linear row or linear column, and wherein the second linear row or linear column is not illuminated by the SIM pattern when the first linear row or linear column is illuminated by the SIM pattern.

10. The SIM system of claim 1, wherein the light source includes at least one of a laser or a light-emitting diode.

11. The SIM system of claim 1, wherein the sample comprises a biological material, and wherein the image sensor is to sense fluorescence emitted by the sample in response to the illuminations.

12. The SIM system of claim 1, wherein the substrate pattern is a periodic pattern, and wherein the SIM system is configured to provide an offset to each of the modulation angles of the SIM pattern to form offset modulation angles, none of the offset modulation angles corresponding to an angle of a symmetry axis of the periodic pattern, wherein at least one of the illuminations is performed at each of the offset modulation angles of the SIM pattern.

13. The SIM system of claim 1, wherein the substrate pattern includes a random pattern, and wherein the pitch of the SIM pattern is based on a resolution relating to the random pattern.

14. The SIM system of claim 13, wherein the pitch of the SIM pattern is about a same order of magnitude as the resolution relating to the random pattern.

15. A method comprising:
    configuring a structured illumination microscopy (SIM) system for performing illuminations of a sample at a substrate having a substrate pattern, wherein the substrate pattern includes a periodic pattern;
    selecting a pitch of a SIM pattern or a grating of the SIM system based on a characteristic of the substrate pattern, wherein the pitch is selected based on a pitch of the periodic pattern, and wherein the grating has a pitch that is between about 1.5 and about 2 times the pitch of the periodic pattern;
    performing the illuminations of the sample at the substrate with the SIM pattern; and
    detecting emissions that the sample generates in response to the illuminations.

16. The method of claim 15, wherein the sample comprises a biological material, and wherein detecting the emissions comprises detecting fluorescence emitted by the sample in response to the illuminations.

17. A structured illumination microscopy (SIM) system comprising:
    a light source;
    a light-structuring component to provide light from the light source with a SIM pattern for performing illuminations of a sample at a substrate having a periodic pattern, the light-structuring component configured for rotation of the SIM pattern about an optical axis into modulation angles, and for providing an offset to each of the modulation angles of the SIM system to form offset modulation angles, none of the offset modulation angles corresponding to an angle of a symmetry axis of the periodic pattern; and
    an image sensor to detect emissions that the sample generates in response to the illuminations.

18. The SIM system of claim 17, wherein the offset is provided such that each of the offset modulation angles is smaller than the corresponding modulation angle.

19. The SIM system of claim 17, wherein the offset is provided such that each of the offset modulation angles is greater than the corresponding modulation angle.

20. The SIM system of claim 17, wherein the offset is about 10-30 degrees.

21. The SIM system of claim 20, wherein the offset is about 20 degrees.

22. The SIM system of claim 21, wherein one of the modulation angles is about 45 degrees, and wherein the offset modulation angle corresponding to the one of the modulation angles is about 25 degrees.

23. The SIM system of claim 17, wherein the periodic pattern comprises nanowells formed at the substrate.

24. The SIM system of claim 23, wherein the periodic pattern comprises that the nanowells are arranged in a square array.

25. The SIM system of claim 24, wherein the square array has the nanowells arranged in linear rows and linear columns, wherein the linear rows are substantially perpendicular to the linear columns.

26. The SIM system of claim 23, wherein a first nanowell is illuminated by the SIM pattern, wherein a second nanowell is adjacent the first nanowell, and wherein the second nanowell is not illuminated by the SIM pattern when the first nanowell is illuminated by the SIM pattern.

27. The SIM system of claim 17, wherein the light source includes at least one of a laser or a light-emitting diode.

28. The SIM system of claim 17, wherein a pitch of the SIM pattern is based on a pitch of the periodic pattern.

29. The SIM system of claim 28, wherein the pitch of the SIM pattern is between about 1.5 and about 2 times the pitch of the periodic pattern.

30. A method comprising:
configuring a structured illumination microscopy (SIM) system for rotation of a SIM pattern about an optical axis into modulation angles, the SIM system configured for performing illuminations of a sample at a substrate having a periodic pattern;
providing an offset to each of the modulation angles of the SIM system to form offset modulation angles, none of the offset modulation angles corresponding to an angle of a symmetry axis of the periodic pattern;
performing the illuminations of the sample at the substrate with the SIM pattern at the offset modulation angles; and
detecting emissions that the sample generates in response to the illuminations.

* * * * *